United States Patent
Curtis et al.

(10) Patent No.: US 9,886,727 B2
(45) Date of Patent: Feb. 6, 2018

(54) AUTOMATIC CHECK-INS AND STATUS UPDATES

(75) Inventors: Scott Curtis, Durham, NC (US); Hugh Svendsen, Chapel Hill, NC (US); Michael W. Helpingstine, Cary, NC (US); Christopher M. Amidon, Apex, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 0 days.

(21) Appl. No.: 13/085,839

(22) Filed: Apr. 13, 2011

(65) Prior Publication Data
US 2012/0124176 A1    May 17, 2012

Related U.S. Application Data

(60) Provisional application No. 61/412,584, filed on Nov. 11, 2010, provisional application No. 61/419,369, filed on Dec. 3, 2010.

(51) Int. Cl.
*G06F 15/16* (2006.01)
*G06Q 50/00* (2012.01)

(52) U.S. Cl.
CPC .................................. *G06Q 50/01* (2013.01)

(58) Field of Classification Search
CPC ........ G06Q 50/01; H04W 4/02; H04W 4/025; H04W 12/02; H04L 63/0227; H04L 67/22; G06F 15/16; G06F 17/30029; G06F 17/3087; G06F 2221/2111; G06F 21/00; G06F 3/048
USPC .......... 709/227, 229; 707/723, 784; 455/457
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,539,232 | A | 7/1996 | Nakanishi et al. |

(Continued)

FOREIGN PATENT DOCUMENTS

| | | |
|---|---|---|
| EP | 1463354 | 12/2005 |
| EP | 2051480 A1 | 4/2009 |

(Continued)

OTHER PUBLICATIONS

MG Siegler. (Aug. 2, 2010). "Check-In on Foursquare Without Taking Your Phone Out of Your Pocket." TechCrunch. Retrieved Nov. 6, 2012, from http://techcrunch.com/2010/08/02/future-checkin/.*

(Continued)

*Primary Examiner* — Dustin Nguyen
*Assistant Examiner* — Juan C Turriate Gastulo

(57) ABSTRACT

Methods and Devices are disclosed for performing automatic check-ins for a user associated with a mobile device. In some embodiments, the process is completely automated with no user intervention once the process has started. In some embodiments, the user is prompted for confirmation before the check-in is generated. The automatic check-in is performed based on detecting a social context which includes a current location of the user of the mobile device and applying rules. The rules may include an action part, a condition part, and qualifier part. The rules and the individual parts of the rules may be independently editable by the user.

23 Claims, 11 Drawing Sheets

(56) References Cited

U.S. PATENT DOCUMENTS

| | | | |
|---|---|---|---|
| 5,713,073 A | 1/1998 | Warsta | |
| 5,754,939 A | 5/1998 | Herz et al. | |
| 6,014,090 A | 1/2000 | Rosen et al. | |
| 6,049,711 A | 4/2000 | Ben-Yehezkel et al. | |
| 6,204,844 B1 | 3/2001 | Fumarolo et al. | |
| 6,240,069 B1 | 5/2001 | Alperovich et al. | |
| 6,349,203 B1 | 2/2002 | Asaoka et al. | |
| 6,446,004 B1 | 9/2002 | Cao et al. | |
| 6,456,852 B2 | 9/2002 | Bar et al. | |
| 6,490,587 B2 | 12/2002 | Easty et al. | |
| 6,529,136 B2 | 3/2003 | Cao et al. | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,658,095 B1 | 12/2003 | Yoakum et al. | |
| 6,668,173 B2 | 12/2003 | Greene | |
| 6,700,506 B1 | 3/2004 | Winkler et al. | |
| 6,708,172 B1 | 3/2004 | Wong et al. | |
| 6,819,919 B1 | 11/2004 | Tanaka | |
| 6,968,179 B1 | 11/2005 | De Vries | |
| 6,970,088 B2 | 11/2005 | Kovach | |
| 6,987,885 B2 | 1/2006 | Gonzalez-Banos et al. | |
| 7,085,571 B2 | 8/2006 | Kalhan et al. | |
| 7,110,744 B2 | 9/2006 | Freeny, Jr. | |
| 7,116,985 B2 | 10/2006 | Wilson et al. | |
| 7,123,918 B1 | 10/2006 | Goodman | |
| 7,158,798 B2 | 1/2007 | Lee et al. | |
| 7,206,568 B2 | 4/2007 | Sudit | |
| 7,227,937 B1 | 6/2007 | Yoakum et al. | |
| 7,236,739 B2 | 6/2007 | Chang | |
| 7,247,024 B2 | 7/2007 | Bright et al. | |
| 7,269,426 B2 | 9/2007 | Kokkonen et al. | |
| 7,272,357 B2 | 9/2007 | Nishiga et al. | |
| 7,280,822 B2 | 10/2007 | Fraccaroli | |
| 7,315,823 B2 | 1/2008 | Brondrup | |
| 7,394,345 B1 | 7/2008 | Ehlinger et al. | |
| 7,398,081 B2 | 7/2008 | Moran | |
| 7,418,268 B1 | 8/2008 | Cabano et al. | |
| 7,423,580 B2 | 9/2008 | Markhovsky et al. | |
| 7,444,655 B2 | 10/2008 | Sardera | |
| 7,509,131 B2 | 3/2009 | Krumm et al. | |
| 7,512,649 B2 | 3/2009 | Faybishenko et al. | |
| 7,558,404 B2 | 7/2009 | Ma et al. | |
| 7,607,096 B2 | 10/2009 | Oreizy et al. | |
| 7,620,404 B2 | 11/2009 | Chesnais et al. | |
| 7,668,537 B2 | 2/2010 | De Vries | |
| 7,680,959 B2 | 3/2010 | Svendsen | |
| 7,770,137 B2 | 8/2010 | Forbes et al. | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 8,010,601 B2 | 8/2011 | Jennings et al. | |
| 8,200,247 B1 * | 6/2012 | Starenky et al. | 455/456.3 |
| 8,208,943 B2 | 6/2012 | Petersen et al. | |
| 8,229,458 B2 * | 7/2012 | Busch | 455/456.1 |
| 2001/0013009 A1 | 8/2001 | Greening et al. | |
| 2002/0010628 A1 | 1/2002 | Burns | |
| 2002/0049690 A1 | 4/2002 | Takano | |
| 2002/0086676 A1 | 7/2002 | Hendrey et al. | |
| 2002/0087335 A1 | 7/2002 | Meyers et al. | |
| 2003/0005056 A1 | 1/2003 | Yamamoto et al. | |
| 2004/0009750 A1 | 1/2004 | Beros et al. | |
| 2004/0025185 A1 | 2/2004 | Goci et al. | |
| 2004/0158739 A1 | 8/2004 | Wakai et al. | |
| 2004/0181668 A1 | 9/2004 | Blew et al. | |
| 2004/0189465 A1 | 9/2004 | Capobianco et al. | |
| 2004/0192331 A1 | 9/2004 | Gorday et al. | |
| 2005/0038876 A1 | 2/2005 | Chaudhuri | |
| 2005/0070298 A1 | 3/2005 | Caspi et al. | |
| 2005/0113123 A1 | 5/2005 | Torvinen | |
| 2005/0130634 A1 | 6/2005 | Godfrey | |
| 2005/0174975 A1 | 8/2005 | Mgrdechian et al. | |
| 2005/0210387 A1 | 9/2005 | Alagappan et al. | |
| 2005/0231425 A1 | 10/2005 | Coleman et al. | |
| 2006/0046743 A1 | 3/2006 | Mirho | |
| 2006/0119882 A1 | 6/2006 | Harris et al. | |
| 2006/0161599 A1 | 7/2006 | Rosen | |
| 2006/0166679 A1 | 7/2006 | Karaoguz et al. | |
| 2006/0195361 A1 | 8/2006 | Rosenberg | |
| 2006/0229058 A1 | 10/2006 | Rosenberg | |
| 2006/0242239 A1 | 10/2006 | Morishima et al. | |
| 2006/0256959 A1 | 11/2006 | Hymes | |
| 2006/0270419 A1 | 11/2006 | Crowley et al. | |
| 2007/0004426 A1 | 1/2007 | Pfleging et al. | |
| 2007/0005419 A1 | 1/2007 | Horvitz et al. | |
| 2007/0015518 A1 | 1/2007 | Winter et al. | |
| 2007/0030824 A1 | 2/2007 | Ribaudo et al. | |
| 2007/0032242 A1 | 2/2007 | Goodman | |
| 2007/0075898 A1 | 4/2007 | Markhovsky et al. | |
| 2007/0135138 A1 | 6/2007 | Brown et al. | |
| 2007/0136228 A1 | 6/2007 | Petersen | |
| 2007/0142065 A1 | 6/2007 | Richey et al. | |
| 2007/0149214 A1 | 6/2007 | Walsh et al. | |
| 2007/0150444 A1 | 6/2007 | Chesnais et al. | |
| 2007/0167174 A1 | 7/2007 | Halcrow et al. | |
| 2007/0174243 A1 | 7/2007 | Fritz | |
| 2007/0179863 A1 | 8/2007 | Stoll | |
| 2007/0203644 A1 | 8/2007 | Thota et al. | |
| 2007/0210936 A1 | 9/2007 | Nicholson | |
| 2007/0210937 A1 | 9/2007 | Smith et al. | |
| 2007/0214180 A1 | 9/2007 | Crawford | |
| 2007/0218900 A1 | 9/2007 | Abhyanker | |
| 2007/0233859 A1 | 10/2007 | Zhao et al. | |
| 2007/0255785 A1 | 11/2007 | Hayashi et al. | |
| 2007/0282621 A1 | 12/2007 | Altman et al. | |
| 2007/0290832 A1 | 12/2007 | Kalinichenko et al. | |
| 2008/0016018 A1 | 1/2008 | Malik | |
| 2008/0016205 A1 | 1/2008 | Svendsen | |
| 2008/0022329 A1 | 1/2008 | Glad | |
| 2008/0032703 A1 | 2/2008 | Krumm et al. | |
| 2008/0043041 A2 | 2/2008 | Hedenstroem et al. | |
| 2008/0076418 A1 | 3/2008 | Beyer, Jr. | |
| 2008/0076505 A1 | 3/2008 | Nguyen et al. | |
| 2008/0086741 A1 | 4/2008 | Feldman et al. | |
| 2008/0092233 A1 | 4/2008 | Tian et al. | |
| 2008/0097999 A1 | 4/2008 | Horan | |
| 2008/0106599 A1 | 5/2008 | Liu et al. | |
| 2008/0113674 A1 | 5/2008 | Baig | |
| 2008/0118106 A1 | 5/2008 | Kilambi et al. | |
| 2008/0120409 A1 | 5/2008 | Sun et al. | |
| 2008/0140650 A1 | 6/2008 | Stackpole | |
| 2008/0146250 A1 | 6/2008 | Aaron | |
| 2008/0155080 A1 | 6/2008 | Marlow et al. | |
| 2008/0158230 A1 | 7/2008 | Sharma et al. | |
| 2008/0168489 A1 | 7/2008 | Schraga | |
| 2008/0182563 A1 | 7/2008 | Wugofski et al. | |
| 2008/0182591 A1 * | 7/2008 | Krikorian | 455/456.3 |
| 2008/0188261 A1 | 8/2008 | Arnone | |
| 2008/0222295 A1 | 9/2008 | Robinson et al. | |
| 2008/0227473 A1 | 9/2008 | Haney | |
| 2008/0242317 A1 | 10/2008 | Abhyanker | |
| 2008/0250312 A1 | 10/2008 | Curtis | |
| 2008/0288338 A1 | 11/2008 | Wiseman et al. | |
| 2008/0288355 A1 | 11/2008 | Rosen | |
| 2008/0306826 A1 | 12/2008 | Kramer et al. | |
| 2008/0313329 A1 | 12/2008 | Wang et al. | |
| 2008/0318597 A1 | 12/2008 | Berns et al. | |
| 2009/0023410 A1 | 1/2009 | Ghosh | |
| 2009/0024315 A1 | 1/2009 | Scheibe | |
| 2009/0030999 A1 | 1/2009 | Gatzke et al. | |
| 2009/0047972 A1 * | 2/2009 | Neeraj | G06Q 10/10 455/456.1 |
| 2009/0076894 A1 | 3/2009 | Bates et al. | |
| 2009/0082038 A1 * | 3/2009 | McKiou et al. | 455/456.6 |
| 2009/0093261 A1 | 4/2009 | Ziskind et al. | |
| 2009/0112467 A1 | 4/2009 | Jiang et al. | |
| 2009/0115570 A1 | 5/2009 | Cusack, Jr. | |
| 2009/0115617 A1 | 5/2009 | Sano et al. | |
| 2009/0132652 A1 | 5/2009 | Athale et al. | |
| 2009/0138346 A1 | 5/2009 | Kalaboukis et al. | |
| 2009/0144211 A1 | 6/2009 | O'Sullivan et al. | |
| 2009/0150501 A1 | 6/2009 | Davis et al. | |
| 2009/0164431 A1 | 6/2009 | Zivkovic et al. | |

(56) References Cited

U.S. PATENT DOCUMENTS

| | | | |
|---|---|---|---|
| 2009/0164459 A1 | 6/2009 | Jennings et al. | |
| 2009/0199242 A1 | 8/2009 | Johnson et al. | |
| 2009/0201896 A1 | 8/2009 | Davis et al. | |
| 2009/0210480 A1 | 8/2009 | Sivasubramaniam et al. | |
| 2009/0215469 A1 | 8/2009 | Fisher et al. | |
| 2009/0287411 A1* | 11/2009 | Sweeney et al. | 701/213 |
| 2009/0287783 A1* | 11/2009 | Beare et al. | 709/206 |
| 2009/0291672 A1 | 11/2009 | Treves et al. | |
| 2009/0307263 A1 | 12/2009 | Skibiski et al. | |
| 2009/0319607 A1 | 12/2009 | Belz et al. | |
| 2009/0327073 A1 | 12/2009 | Li et al. | |
| 2010/0004857 A1 | 1/2010 | Pereira et al. | |
| 2010/0017261 A1 | 1/2010 | Evans et al. | |
| 2010/0020776 A1 | 1/2010 | Youssef et al. | |
| 2010/0062794 A1 | 3/2010 | Han | |
| 2010/0082427 A1 | 4/2010 | Burgener et al. | |
| 2010/0113065 A1 | 5/2010 | Narayan et al. | |
| 2010/0130226 A1 | 5/2010 | Arrasvuori et al. | |
| 2010/0130233 A1 | 5/2010 | Parker | |
| 2010/0153144 A1 | 6/2010 | Miller et al. | |
| 2010/0162149 A1 | 6/2010 | Sheleheda et al. | |
| 2010/0185552 A1 | 7/2010 | DeLuca et al. | |
| 2010/0197318 A1 | 8/2010 | Petersen et al. | |
| 2010/0197319 A1 | 8/2010 | Petersen et al. | |
| 2010/0198683 A1 | 8/2010 | Aarabi | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2010/0201482 A1 | 8/2010 | Robertson et al. | |
| 2010/0201536 A1 | 8/2010 | Robertson et al. | |
| 2010/0259386 A1 | 10/2010 | Holley et al. | |
| 2010/0273509 A1 | 10/2010 | Sweeney et al. | |
| 2010/0279713 A1* | 11/2010 | Dicke | 455/457 |
| 2011/0083101 A1* | 4/2011 | Sharon et al. | 715/800 |
| 2011/0109632 A1* | 5/2011 | Gorev | 345/440 |
| 2011/0136506 A1 | 6/2011 | Stewart | |
| 2012/0041983 A1* | 2/2012 | Jennings | 707/784 |
| 2012/0047129 A1* | 2/2012 | Redstone et al. | 707/723 |
| 2012/0063427 A1 | 3/2012 | Kandekar et al. | |
| 2012/0066138 A1 | 3/2012 | Curtis et al. | |
| 2012/0066302 A1 | 3/2012 | Petersen et al. | |
| 2012/0072495 A1 | 3/2012 | Jennings et al. | |
| 2012/0123830 A1 | 5/2012 | Svendsen et al. | |
| 2012/0123871 A1 | 5/2012 | Svendsen et al. | |
| 2012/0123875 A1 | 5/2012 | Svendsen et al. | |
| 2012/0252418 A1 | 10/2012 | Kandekar et al. | |

FOREIGN PATENT DOCUMENTS

| | | |
|---|---|---|
| EP | 2151797 A1 | 2/2010 |
| GB | 2399928 A | 9/2004 |
| WO | 2006/118755 A2 | 11/2006 |
| WO | 2007/092668 A2 | 8/2007 |
| WO | WO 2008/000046 | 1/2008 |
| WO | WO 2009/039350 | 3/2009 |
| WO | 2009/043020 A2 | 4/2009 |
| WO | WO 2009/055501 | 4/2009 |
| WO | WO 2009/077655 | 6/2009 |
| WO | WO 2010/006062 | 1/2010 |

OTHER PUBLICATIONS

Christina Warren, Jul. 19, 2010. "Loopt Automatically Lets You Know When Your Friends Are Nearby" Retrieved on Sep. 11, 2013 from <http://mashable.com/2010/07/19/loopt-proximity-alerts/>.*

Tim Sears, Jul. 27, 2010. "Future Checkin—The fastest and easiest way to auto-checkin to Foursquare from your iPhone." Retrieved on Nov. 24, 2014, from <http://www.youtube.com/watch?v=Hxfaulnlu_A#t=48>.*

AppSafari, Aug. 28, 2010. "Checkmate for Foursquare review." Retrieved on Dec. 10, 2015 from <http://www.appsafari.com/social/13226/checkmate-for-foursquare/>.*

Barbierri, Cody. Sep. 29, 2010. " Mayor Maker lets you automatically check in and out of locations" Retreived on Dec. 10, 2015 from <http://venturebeat.com/2010/09/29/location-labs-mayor-maker/>.*

Van Grove, Jennifer, Aug. 25, 2010 "iPhone App Uses Background Location for Automatic Checkins on Foursquare" Retrieved on Nov. 7, 2016 from <http://mashable.com/2010/08/25/checkmateforfoursquare/# 4d8QTr.g5kq6>.*

Choney, Suzanne, "Mobile services mushroom for locating friends," Aug. 14, 2008, copyright 2008, MSNBC.com, 1 page.

Cox, L.P. et al., "Presence-Exchanges: Toward Sustainable Presence-Sharing," in Proc. of 7th IEEE Workshop on Mobile Computing Systems and Applications, Apr. 6-7, 2006, Semiahmoo Resort, Washington, pp. 55-60, 6 pages.

"dodgeball.com :: mobile social software," at <http://www.dodgeball.com/>, copyright 2008, Google Inc., printed Jan. 16, 2008, 1 page.

"Face in Hole", at <http://www.mahalo.com/face-in-hole>, states that the website debuted in Mar. 2008, copyright 2007-2010, Mahalo.com Incorporated, printed Oct. 26, 2010, 4 pages.

"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

Ha, Anthony, "Shopkick's mobile shopping app tracks you in stores, delivers real-time deals," Aug. 3, 2010, found at <http://venturebeat.com/2010/08/03/shopkick-best-buy/>, printed Nov. 10, 2011, 6 pages.

"Late problem solved: first GPS based notification for Mobile phones goes online," Jul. 3, 2007, copyright 2006-2007, Office Assitance LLC, at <http://www.office-outlook.com/outlook-news/late-problem-solved-fir. . .>, originally published Jul. 2, 2007, PR Newswire Association LLC, at <http://www.prnewswire.com/news-releases/late-problem-solved-first-gps-based-notification-for-mobile-phones-goes-online-52696107.html>, 1 page.

Li, N. et al., "Analysis of a Location-based Social Network," IEEE International Conference on Computa-tional Science and Engineering, Symposium on Social Intelligence and Networking, Aug. 29-31, 2009, vol. 4, IEEE Computer Society, Los Alamitos, California, pp. 263-270, article found at <http://www.cs.uml.edu/~glchen/papers/brightkite-sin09.pdf>, 8 pages.

Murph, D., "GPS notification software informs managers of your tardiness," posted Jul. 2, 2007, copyright 2003-2007, Weblogs, Inc., found at <http://www.engadget.com/2007/07/02/gps-notification-service-infor . . .>, printed Sep. 24, 2007, 5 pages.

Perez, Sarah, "How to Hack Nike+ for Automatic Foursquare Check-ins," Sep. 3, 2010, found at <http://www.readwriteweb.com/archives/how_to_hack_nike_for_automatic_foursquare_check-ins.php>, printed Mar. 10, 2011, 4 pages.

Perkins, S., "Foursquare Testing NFC, Adds Merchant Rewards," Mar. 10, 2011, found at <http://www.slashgear.com/foursquare-testing-nfc-adds-merchant-rewards-10139249/#, copyright 2006-2011, SlashGear, printed Mar. 11, 2011, 8 pages.

stumble!to, "About stumble!to," found at <http://stumble.to/about> on the Internet Archive, dated Sep. 21, 2010, printed Nov. 10, 2011, 1 page.

Siegler, MG, "Check-In on Foursquare Without Taking Your Phone Out of Your Pocket," Aug. 2, 2010, found at <http://techcrunch.com/2010/08/02/future-checkin/#>, copyright 2011, TechCrunch, printed Mar. 10, 2011, 10 pages.

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.

"About Loopt," at <http://about.loopt.com/>, printed May 3, 2011, 4 pages.

Oh, Sejin et al., "CAMAR: Context-aware Mobile Augmented Reality in Smart Space," in Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

(56) References Cited

OTHER PUBLICATIONS

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Wu et al., "Crowd Flow Segmentation Using a Novel Region Growing Scheme," in Proceedings PCM 2009, 10th Pacific Rim Conference on Multimedia, Bangkok, Thailand, Dec. 15-18, 2009, pp. 898-907, 10 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

Anciaux, N. et al., "Data Degradation: Making Private Data Less Sensitive Over Time," CIKM 2008, Oct. 26-30, 2008, Napa Valley, California, 2 pages.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

"Final: OpenID Attribute Exchange 1.0—Final," at <http://openid.net/specs/openid-attribute-exchange-1_0.html>, Dec. 5, 2007, printed May 11, 2012, 11 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"Loopt—About Us," at <https://loopt.com/loopt/aboutUs.aspx>, from the Internet Archive, dated Jun. 29, 2007, copyright 2007, Loopt, Inc., 1 page.

"MobiClique," copyright 2007-2009, Thomson, originally found at <http://www.thlab.net/~apietila/mobiclique/>, printed Oct. 23, 2009, 5 pages.

Abstract, Ratti, C. et al., "Mobile Landscapes: using location data from cell phones for urban analysis," Environment and Planning B: Planning and Design, vol. 33, No. 5, 2006, pp. 727-748, 1 page.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Plazes—Right Plaze, Right Time," at <http://plazes.com>, copyright 2004-2011, Plazes AG, printed May 3, 2011, 2 pages.

Miller, B. N. et al., "PocketLens: Toward a Personal Recommender System," ACM Transactions on Information Systems, vol. 22, No. 3, Jul. 2004, pp. 437-476, 40 pages.

"Resource Description Framework (RDF) / W3C Semantic Web Activity," at <http://www.w3.org/RDF/>, from the Internet Archive dated Jul. 30, 2008, printed Aug. 10, 2012, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—Technology," at <http://www.sensenetworks.com/technology.php>, copyright 2008-2009, Sense Networks, printed Jan. 12, 2009, 2 pages.

"Sense Networks—The Minimum Volume Embedding Algorithm," at <http://www.sensenetworks.com/mve_algorithm.php>, copyright 2008-2009, Sense Networks, printed Jan. 12, 2009, 2 pages.

Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Agostini, A. et al., "Towards Highly Adaptive Services for Mobile Computing,"in Proceedings of IFIP TC8 Working Conference on Mobile Information Systems (MOBIS), Sep. 15-17, 2004, Oslo, Norway, Springer, 2004, pp. 121-134, 14 pages.

* cited by examiner

AUTOMATIC CHECK-INS AND STATUS UPDATES

RELATED APPLICATIONS

This application claims the benefit of provisional patent application Ser. No. 61/412,584, filed Nov. 11, 2010, and provisional patent application Ser. No. 61/419,369, filed Dec. 3, 2010, the disclosures of which are hereby incorporated herein by reference in their entireties.

FIELD OF THE DISCLOSURE

The present disclosure relates to, in a first aspect, automatically sharing the location of a user based on a social context of the user. In another aspect, the present disclosure relates to automatically generating and sending a status update for a user based on a social context of the user.

BACKGROUND

People are becoming increasingly comfortable with revealing or reporting some aspects of their current location and activities to their social network via check-in services such as FourSquare™ and social networking services such as Facebook®. However, in both instances, the current generation of services is predominantly manual. There is a desire for a system and method for performing automatic check-ins and/or generating and sending status updates.

SUMMARY

The present disclosure relates to automatically sharing a location of a user and/or automatically generating and sending a status update for a user based on a social context of the user. As used herein, a social context of a user is generally any data that describes a location at which the user is currently located or users that are spatially proximate to the user. Notably, data that describes a location is to be distinguished from the location itself. In one embodiment, a social context of a user is determined. Then, a determination is made as to whether to automatically share a current location of the user based on the social context of the user and one or more predefined automatic location sharing rules. The current location of the user is then automatically shared if the determination is made to automatically share the current location of the user. In one preferred embodiment, the current location of the user is shared by performing an automatic check-in for the user at a Point of Interest (POI) that corresponds to the current location of the user.

In another embodiment, a social context of a user is determined. Then, a determination is made as to whether to send an automatic status update for the user based on the social context of the user and one or more predefined automatic status update rules. If the determination is made to send the automatic status update, a status update is automatically generated and sent on behalf of the user. In one embodiment, the status update is personalized based on the social context of the user.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to automatically sharing a location of a user and/or automatically generating and sending a status update for a user based on a social context of the user. As used herein, a social context of a user is generally any data that describes a location at which the user is currently located or users that are spatially proximate to the user. Notably, data that describes a location is to be distinguished from the location itself. For example, the location may be a street address, whereas the data that describes the location may be a name of a corresponding Point of Interest (POI) (e.g., a business name) located at that street address. Specifically, as used herein, a social context of a user includes one or more of the following: a POI corresponding to the current location of the user, information describing a POI corresponding to the current location of the user, information describing an event currently being held at a POI corresponding to the current location of the user, historical aggregate profile data for the current location of the user, an aggregate profile for a crowd of users in which the user is currently located, an aggregate profile for each of one or more crowds currently located near the user, a list of nearby devices, a list of nearby users, a list of nearby friends, a list of nearby friends and friends-of-friends, mode of transportation, activity being performed by the user (e.g., listening to song X by artist Y), and websites that the user is logged into at that time. As used herein, a "check-in" is an electronic means by which a user indicates that he or she is currently located at a particular place (e.g., a POI). The indication may be sent to other users, retrieved by other users, sent to or retrieved by businesses, displayed on social networking sites or other websites, or the like. As used herein, a status update is a text, audio, or video message posted or otherwise sent by a user. Preferably, the status update is sent to and published by a social networking service (e.g., a Facebook® post or Twitter® tweet). Further, the status update may be published to other users or entities (e.g., businesses).

Figure 1:
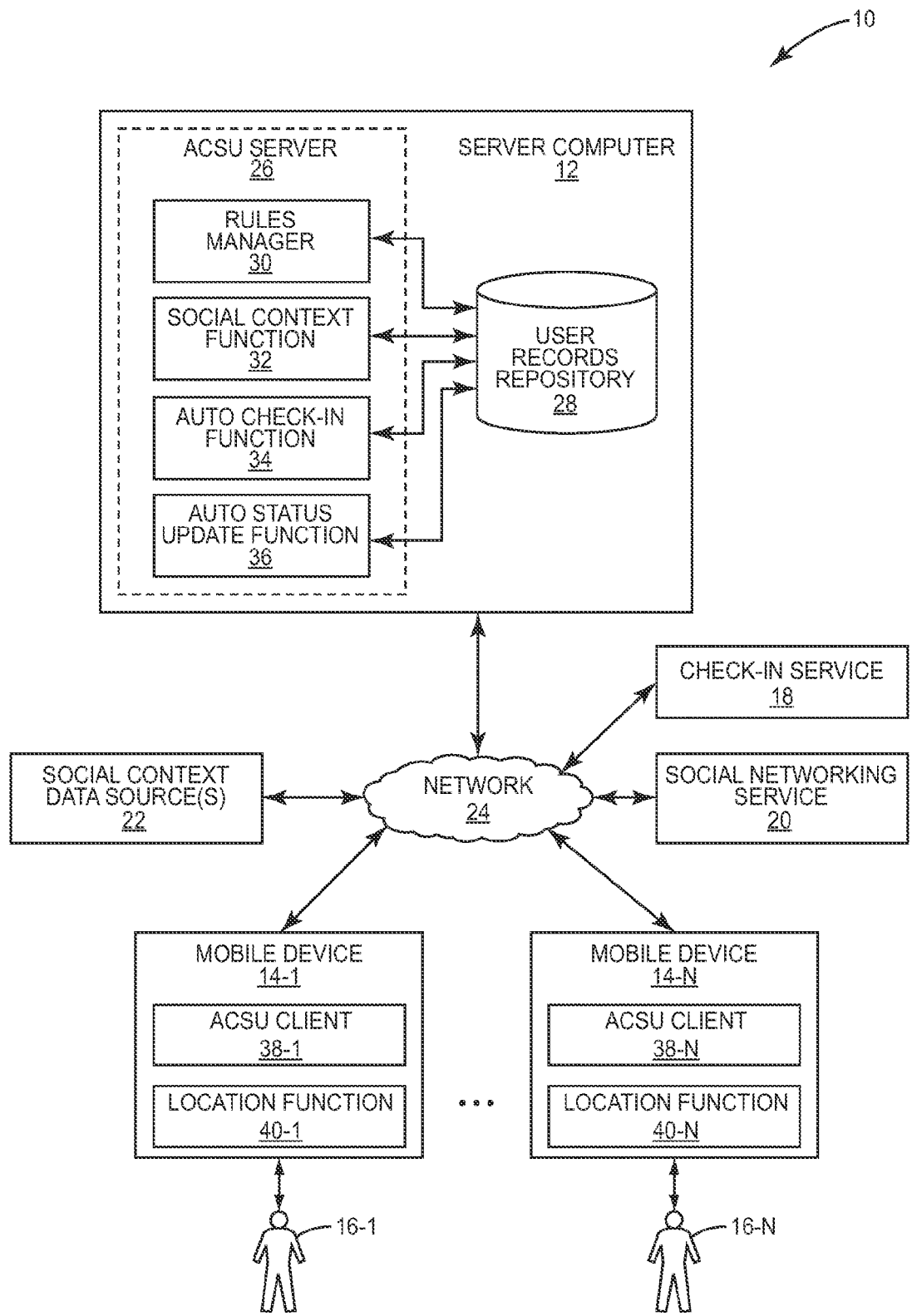
FIG. 1 illustrates a system for performing automatic check-ins and/or automatically generating and sending status updates for users based on social contexts of the users according to one embodiment of the present disclosure.

FIG. 1 illustrates a system 10 for performing automatic check-ins and/or generating and sending automatic status updates for users according to one embodiment of the present disclosure. Notably, while check-ins are discussed herein as being the preferred manner in which to share the current locations of the users, the present disclosure is not limited thereto. Other location sharing technologies may be used. As illustrated, the system 10 includes a server computer 12, a number of mobile devices 14-1 through 14-N (generally referred to herein collectively as mobile devices 14 or individually as mobile device 14) having associated users 16-1 through 16-N (generally referred to herein collectively as users 16 and individually as user 16), a check-in service 18, a social networking service 20, and one or more social context data sources 22 connected via a network 24. The network 24 may be any type of network or any combination of networks. Specifically, the network 24 may include wired components, wireless components, or both wired and wireless components. In one exemplary embodiment, the network 24 is a distributed public network such as the Internet, where the mobile devices 14 are enabled to connect to the network 24 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

The server computer 12 is a physical computing device (i.e., a hardware device). Note that while only a single server computer 12 is illustrated, it should be appreciated that the functions of the server computer 12 described herein may be performed by a number of server computers 12 operating in a collaborative manner for purposes of redundancy and/or load sharing. As illustrated, the server computer 12 hosts an Automatic Check-in and Status Update (ACSU) server 26 and a user records repository 28. The ACSU server 26 is preferably implemented in software and is executed by the server computer 12. As discussed below, the user records repository 28 is maintained by the ACSU server 26 and stored in one or more secondary storage devices of the server computer 12. The user records repository 28 includes a user record for each of the users 16. For each user 16, the user record of the user 16 includes one or more automatic check-in rules defined by the user 16, one or more automatic status update rules defined by the user 16, and credentials of the user 16 (e.g., username(s) and password(s) for accessing the check-in service 18 and/or the social networking service 20). In addition, the user record of the user 16 may include one or more social context records that store social context data that defines the social context of the user 16 over time.

The ACSU server 26 includes a rules manager 30, a social context function 32, an automatic check-in function 34, and an automatic status update function 36, which may be implemented by one or more corresponding software components. As described below in detail, the rules manager 30 generally operates to obtain automatic check-in rules and automatic status update rules from the users 16 and store the automatic check-in rules and automatic status update rules in the corresponding user records of the users 16 maintained in the user records repository 28. The social context function 32 operates to determine the social contexts of the users 16. The automatic check-in function 34 operates to perform automatic check-ins for the users 16 based on the social contexts of the users 16 and the corresponding automatic check-in rules of the users 16. In general, for each of the users 16, rather than performing automatic check-ins for all POIs visited by the user 16, automatic check-ins are performed only when appropriate as determined by the social context of the user 16 and the automatic check-in rules of the user 16. Similarly, the automatic status update function 36 operates to generate and send automatic status updates for the users 16 based on the social contexts of the users 16 and the corresponding automatic status update rules of the users 16. In general, for each of the users 16, automatic status updates are generated and sent only when appropriate as determined by the social context of the user 16 and the automatic status update rules of the user 16.

Each of the mobile devices 14 is generally any type of mobile personal computing device such as, but not limited to, a mobile smart phone, a portable media player device, a mobile gaming device, an e-book device, a notebook or laptop computer, a tablet computer, or the like. Some exemplary mobile devices that may be programmed or otherwise configured to operate as the mobile devices 14 are the Apple® iPhone®, the Palm Pre®, the Samsung Rogue™, the Blackberry Storm™, the Motorola DROID or similar phone running Google's Android™ Operating System, an Apple® iPad®, and the Apple® iPod Touch® device. However, this list of exemplary mobile devices is not exhaustive and is not intended to limit the scope of the present disclosure.

The mobile devices 14-1 through 14-N include ACSU clients 38-1 through 38-N (generally referred to herein collectively as ACSU clients 38 and individually as ACSU client 38) and location functions 40-1 through 40-N (generally referred to herein collectively as location functions 40 and individually as location function 40), respectively. For each of the mobile devices 14, the ACSU client 38 of the mobile device 14 is preferably implemented in software and executed by the mobile device 14. In general, the ACSU client 38 enables the user 16 to interact with the ACSU server 26 to define automatic check-in rules and/or automatic status update rules and provide credentials for accessing the check-in service 18 and/or the social networking service 20 for the user 16. In addition, in some embodiments, the ACSU client 38 obtains a current location of the mobile devices 14 from the corresponding location functions 40 and provides the current location of the mobile devices 14, and thus the users 16, to the ACSU server 26 automatically or upon request.

Still further, in some embodiments, the ACSU client 38 gathers and reports at least some social context data to the ACSU server 26. The ACSU client 38 may collect social context data such as, for example, device identifiers of nearby devices, calendar information from a calendar application or calendar feature of an application on the mobile device 14, mode of transportation, activity performed by the user 16, and websites the user 16 is logged in to. Additionally, information such as aggregate profile information may be available at the ACSU client 38, or the like. The device identifiers of nearby devices may be, for example, Bluetooth® identifiers (IDs) of devices detected by a Bluetooth® interface (not shown) of the mobile device 14, Media Access Control (MAC) addresses of devices detected by a local wireless interface (not shown) of the mobile device 14 such as, for example, a Bluetooth® interface or IEEE 802.11x interface of the mobile device 14. The calendar information may be a calendar entry, or data from a calendar entry, that contains data describing the current location of the user 16, data identifying friends currently located near the user 16 (e.g., other attendees of a meeting being attended by the user 16), or the like.

The location function 40 of the mobile device 14 may be implemented in hardware, software, or a combination thereof. In one embodiment, the location function 40 operates to determine or otherwise obtain the location of the mobile device 14. As used herein, the location of the mobile device 14 includes any information that defines the location of the mobile device 14 in two-dimensional or three-dimensional space such as, for example, a latitude and longitude coordinate pair and optionally an altitude, a street address, or the like. For example, the location function 40 may be or include a Global Positioning System (GPS) receiver. In addition or alternatively, the location function 40 may include hardware and/or software that enables improved location tracking in indoor environments such as, for example, shopping malls. For example, the location function 40 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

In this embodiment, the check-in service 18 is a third-party service hosted by one or more server computers. The check-in service 18 is a service by which users, such as but not limited to the users 16, are enabled to manually check-in to POIs via their mobile devices while the users 16 are at those POIs. For example, if the user 16-1 were to visit Sullivan's Steakhouse at 414 Glenwood Avenue in Raleigh, N.C., the user 16-1 may manually check-in to Sullivan's Steakhouse via the check-in service 18. One exemplary check-in service is the FourSquare™ check-in service. However, whereas the check-in service 18 enables users to manually check-in, the ACSU server 26 interacts with the check-in service 18 to enable automatic check-ins for the users 16.

In this embodiment, the social networking service 20 is a third-party service hosted by one or more server computers. The social networking service 20 is generally any type of social networking service that enables users, such as the users 16, to manually create and send status updates to individuals or groups of users (e.g., send status updates by posts to Facebook® friends or groups, send tweets to Twitter® followers, or the like). Exemplary social networking services are the Twitter® social networking service, the Facebook® social networking service, the MySpace® social networking service, and the like. However, whereas the social networking service 20 enables users to manually send status updates, the ACSU server 26 interacts with the social networking service 20 to enable automatic status updates from the users 16.

It should be noted that while the check-in service 18 and the social network service 20 are third-party services in this embodiment, the present disclosure is not limited thereto. In an alternative embodiment, some or all of the functionality of the ACSU server 26 may be incorporated into the check-in service 18 and/or the social networking service 20. For example, the functionality of the ACSU server 26 with respect to automatic check-ins may be incorporated into the check-in service 18, and the functionality of the ACSU server 26 with respect to automatic status updates may be incorporated into the social networking service 20. Alternatively, the ACSU server 26 may include the check-in service 18, the social networking service 20, and/or one or more social context data source(s) 22.

The one or more social context data sources 22 are generally any type of source(s) that may be utilized to obtain data that defines the social context of the users 16 based on, for example, the current locations of the users 16. In one embodiment, the one or more social context data sources 22 include a Mobile Aggregate Profile (MAP) server that operates to provide historical aggregate profile data and/or aggregate profiles for crowds of users as described in U.S. Patent Application Publication No. 2010/0198828, entitled "Forming Crowds And Providing Access To Crowd Data In A Mobile Environment," which was filed Dec. 23, 2009 and published Aug. 5, 2010; U.S. Patent Application Publication No. 2010/0197318, entitled "Anonymous Crowd Tracking," which was filed Dec. 23, 2009 and published Aug. 5, 2010; U.S. Patent Application Publication No. 2010/0198826, entitled "Maintaining A Historical Record Of Anonymized User Profile Data By Location For Users In A Mobile Environment," which was filed Dec. 23, 2009 and published Aug. 5, 2010; U.S. Patent Application Publication No. 2010/0198917, entitled "Crowd Formation For Mobile Device Users," which was filed Dec. 23, 2009 and published Aug. 5, 2010; U.S. Patent Application Publication No. 2010/0198870, entitled "Serving A Request For Data From A Historical Record Of Anonymized User Profile Data In A Mobile Environment," which was filed Dec. 23, 2009 and published Aug. 5, 2010; U.S. Patent Application Publication No. 2010/0198862, entitled "Handling Crowd Requests For Large Geographic Areas," which was filed Dec. 23, 2009 and published Aug. 5, 2010; and U.S. Patent Application Publication No. 2010/0197319, entitled "Modifying A User's Contribution To An Aggregate Profile Based On Time Between Location Updates And External Events," which was filed Dec. 23, 2009 and published Aug. 5, 2010; all of which are hereby incorporated herein by reference for their teachings related to historical aggregate profile data and aggregate profiles for crowds of users.

The one or more social context data sources 22 may also include one or more web-based sources of content that describe the current locations of the users 16. For example, if the user 16-1 is located at a POI that is a venue where various types of sporting events, concerts, and the like are held, the social context data sources 22 may include a web-based source that may be queried or searched by the ACSU server 26 to obtain data that describes the event being held at the venue at a desired point in time. For instance, for a particular point in time, the ACSU server 26 may query the web-based source to obtain data that indicates that the user 16-1 is attending a concert for a particular music group, which is data that describes the social context of the user 16-1 at that time.

The one or more social context data sources 22 may also include one or more databases or sources for mapping the current locations of the users 16 to POIs or POI types of the POIs at which the users 16 are currently located. Alternatively, the server computer 12 may host or otherwise have access to a POI database that can be utilized to map the current locations of the users 16 to POIs at which the users 16 are located and/or POI types of the POIs at which the users 16 are located.

Figure 2:
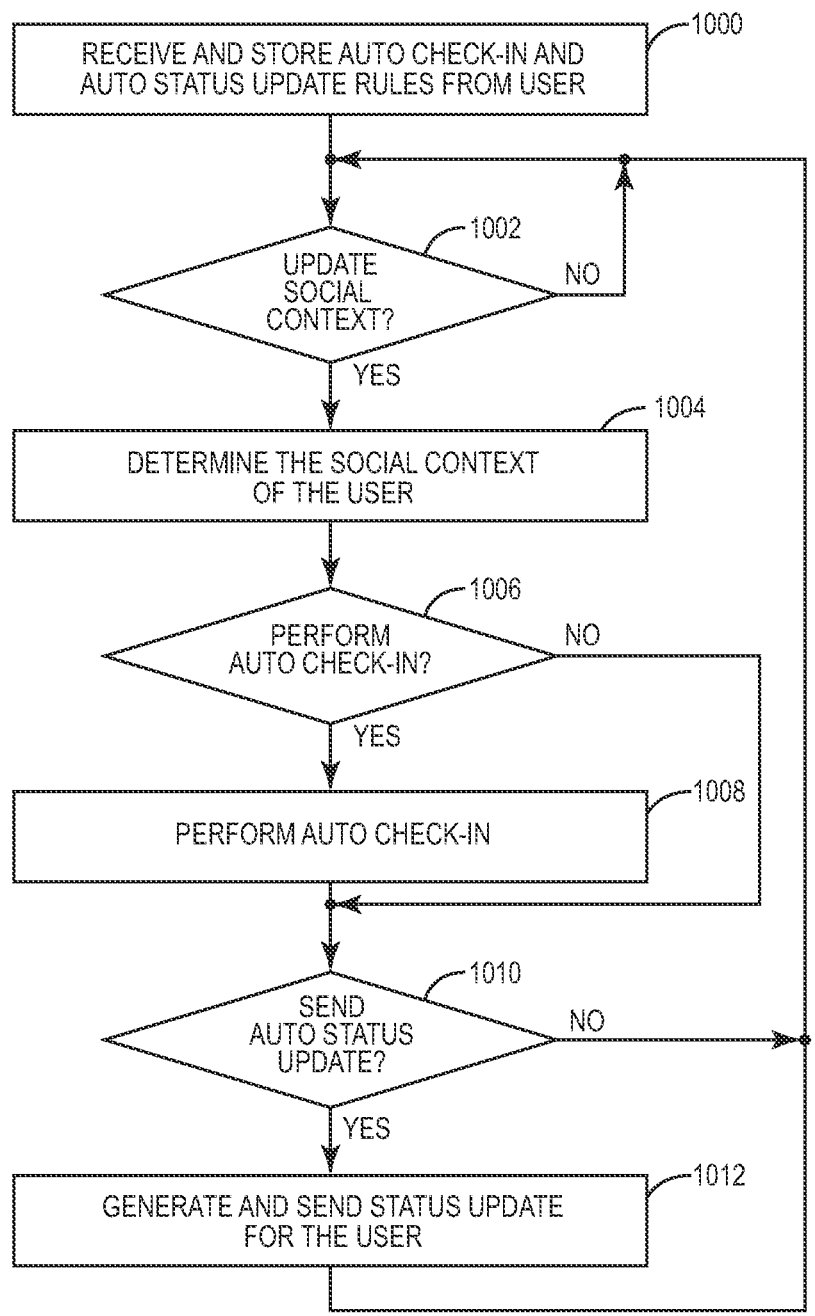
FIG. 2 is a flow chart illustrating the operation of the Automatic Check-in and Status Update (ACSU) server of FIG. 1 according to one embodiment of the present disclosure.

FIG. 2 is a flow chart illustrating the operation of the ACSU server 26 of FIG. 1 according to one embodiment of the present disclosure. As illustrated, the rules manager 30 of the ACSU server 26 first receives automatic check-in and automatic status update rules from one of the users 16 and stores the automatic check-in and automatic status update rules in the user record of the user 16 (step 1000). Note that while FIG. 2 illustrates receiving and storing the automatic check-in and automatic status update rules as a single step 1000, it should be appreciated that the user 16 is preferably enabled to update the automatic check-in and automatic status update rules as desired.

More specifically, in one embodiment, the ACSU client 38 of the mobile device 14 of the user 16 provides an interface by which the user 16 is enabled to define and update the automatic check-in rules and automatic status update rules of the user 16. In general, the automatic check-in rules define social contexts for which automatic check-ins are permitted by the user 16. More specifically, the automatic check-in rules may positively define social contexts for which automatic check-ins are permitted (e.g., a rule stating that automatic check-ins are permitted for restaurants) or negatively define social contexts for which automatic check-ins are not permitted (e.g., a rule stating that automatic check-ins are not permitted for doctor's offices). The automatic check-in rules may be prioritized in order to, for example, resolve conflicting rules. The automatic check-in rules may be based on criteria including one or more of the following:

POI type (e.g., restaurant, house of worship, grocery store, hardware store, clothing store, sports arena, bar, park, city, or the like);

event data that describes the event being held at the POI at which the user 16 is located;

historical aggregate profile data for the current location of the user 16;

aggregate profile for a crowd of users in which the user 16 is located;

aggregate profiles of one or more crowds of users 16 near the current location of the user 16;

device IDs of devices located near the current location of the user 16;

friends in a social network of the user 16 (i.e., other users directly related to the user 16 in a social network such as that maintained by the social networking service 20) that are located at or near the current location of the user 16 (e.g., within a predefined distance from the user 16 or at the same POI);

number of friends in a social network of the user 16 that are located at or near the current location of the user 16;

friends-of-friends of the user 16 (i.e., other users that are indirectly related to the user 16 in a social network such as that maintained by the social networking service 20) that are located at or near the current location of the user 16; and number of friends and friends-of-friends of the user 16 that are located at or near the current location of the user 16.

Notably, a friend-of-friend of the user 16 may be a predefined maximum number of degrees of separation (e.g., limited to 2 degrees of separation such that the friends-of-friends only include friends of direct friends of the user 16 or limited to 3 degrees of separation such that the friends-of-friends include both friends of direct friends of the user 16 and friends-of-friends of direct friends of the user 16).

As an example, the user 16 may define automatic check-in rules such as:

do not perform automatic check-ins when located at a doctor's office because the user 16 deems being at a doctor's office as being too private to share with others;

do not perform automatic check-ins when located at a grocery store because the user 16 deems being at a grocery store as too boring to share with others;

perform automatic check-ins when located at any restaurant;

perform automatic check-ins when located at any POI where a concert or sporting event is being held;

perform automatic check-ins when located at any POI having a historical profile having defined characteristics;

do not perform automatic check-ins when located in or near a crowd having an aggregate profile having defined characteristics;

do not perform automatic check-ins when a device having a defined Bluetooth® ID is detected by a Bluetooth® interface of the mobile device 14 of the user 16;

perform automatic check-ins when one or more defined friends are near the current location of the user 16 (e.g., within a defined distance from the current location of the user 16 or at the same POI); or perform automatic check-ins when at least a threshold number of friends or friends-of-friends of the user 16 are near the current location of the user 16 (e.g., within a defined distance from the current location of the user 16 or at the same POI).

In a similar manner, the automatic status update rules define social contexts for which automatic status updates are permitted. The automatic status update rules may be prioritized in order to, for example, resolve conflicting rules. More specifically, the automatic status update rules may positively define social contexts for which automatic status updates are permitted (e.g., a rule stating that automatic status updates are permitted for restaurants) or negatively define social contexts for which automatic status updates are not permitted (e.g., a rule stating that automatic status updates are not permitted for doctor's offices). Like the automatic check-in rules, the automatic status update rules may also be based on criteria including one or more of the following:

POI type (e.g., restaurant, house of worship, grocery store, hardware store, clothing store, sports arena, bar, or the like);

event data that describes the event being held at the POI at which the user 16 is located;

historical aggregate profile data for the current location of the user 16;

aggregate profile for a crowd of users in which the user 16 is located;

aggregate profiles of one or more crowds of users 16 near the current location of the user 16;

device IDs of devices located near the current location of the user 16;

friends in a social network of the user 16 (i.e., other users directly related to the user 16 in a social network such as that maintained by the social networking service 20) that are located at or near the current location of the user 16;

number of friends in a social network of the user 16 that are located at or near the current location of the user 16;

friends-of-friends of the user 16 (i.e., other users that are indirectly related to the user 16 in a social network such as that maintained by the social networking service 20) that are located at or near the current location of the user 16; and number of friends and friends-of-friends of the user 16 that are located at or near the current location of the user 16.

As an example, the user 16 may define automatic status update rules such as:

do not generate and send automatic status updates when located at a doctor's office because the user 16 deems being at a doctor's office as being too private to share with others;

do not generate and send automatic status updates when located at a grocery store because the user 16 deems being at a grocery store as too boring to share with others;

generate and send automatic status updates when located at any restaurant;

generate and send automatic status updates when located at any POI where a concert or sporting event is being held;

generate and send automatic status updates when located at any POI having a historical profile having defined characteristics;

do not generate and send automatic status updates when located in or near a crowd having an aggregate profile having defined characteristics;

do not generate and send automatic status updates when a device having a defined Bluetooth® ID is detected by a Bluetooth® interface of the mobile device 14 of the user 16;

generate and send automatic status updates when one or more defined friends are near the current location of the user 16 (e.g., within a defined distance from the current location of the user 16 or at the same POI); or generate and send automatic status updates when at least a threshold number of friends or friends-of-friends of the user 16 are near the current location of the user 16 (e.g., within a defined distance from the current location of the user 16 or at the same POI).

The automatic status update rules may be global rules that apply to all automatic status updates from the corresponding user 16. For example, the automatic status update rules may be a single set of rules that define when automatic status updates are to be tweeted from the user 16 via Twitter® to all of the Twitter® followers of the user 16, when automatic status updates are to be posted to the Facebook® wall of the user 16 where the status updates are visible to all Facebook® friends of the user 16, or the like. In addition or alternatively, the user 16 may define separate sets of automatic status update rules for different groups of users (e.g., different Facebook® groups; friends versus friends-of-friends; family versus friends; or the like) or different individuals (e.g., different friends). Note that the ACSU server 26 may interact with the social networking service 20 to obtain a listing of the different groups of users and friends of the user 16 if separate sets of automatic status update rules are to be provided for different groups of users or different friends of the user 16.

Once the automatic check-in and automatic status update rules are received and stored, the social context function 32 determines whether it is time to update the social context of the user 16 (step 1002). For example, the social context function 32 may determine that it is time to update the social context of the user 16 in response to a triggering event. As discussed below, in one embodiment, the triggering event is the receipt of a location update and, optionally, social context data from the mobile device 14 of the user 16. If it is not time to update the social context of the user 16, the process returns to step 1002.

If it is time to update the social context of the user 16, the social context function 32 of the ACSU server 26 determines the social context of the user 16 (step 1004). In general, the social context function 32 determines the social context of the user 16 by obtaining social context data that defines the social context of the user 16 from the mobile device 14 of the user 16 and/or the one or more social context data sources 22. More specifically, in one embodiment, the social context function 32 obtains the current location of the user 16 and maps the current location to a POI at which the user 16 is located. The current location of the user 16 may be mapped to the POI at which the user 16 is located using a local POI database stored by the server computer 12 or a remote POI database. The POI database stores, for each of a number of known POIs, information defining locations that map to the POI, a name of the POI (e.g., Sullivan's Steakhouse), and optionally information describing the POI (e.g., POI type). In one exemplary embodiment, the information that defines locations that map to a POI is a location (e.g., a latitude and longitude) and a geographic area that is centered at or otherwise encompasses the location such that the current location of the user 16 is mapped to the POI if the current location of the user 16 is within the geographic area for the POI. As a specific example, the information that defines locations that map to a POI may be a location and a radius (e.g., 50 meters) such that the current location of the user 16 is mapped to the POI if the current location of the user 16 is within the defined radius from the defined location for the POI. If no POI is found for the current location of the user 16, the social context function 32 may assign the closest POI. Alternatively, the social context function 32 may create a new POI based on the current location of the user 16. For example, the social context function 32 may determine the closest known street address to the current location and create a POI for that street address. In another example, the social context function 32 may also default to the closest zip code, city, etc. POIs may be nested. For example, there may be a POI for a city and several POIs within the city. In addition, if the POI to which the current location of the user 16 is mapped or assigned is a venue at which events are held, the social context function 32 may query or search one or more of the social context data sources 22 to obtain data describing the event that is being held at the venue at the current time, if any. The POI, information describing the POI, and data describing any event being held at the venue form social context data that may define, at least in part, the social context of the user 16.

In addition or alternatively, the one or more social context data sources 22 may include a source of historical aggregate profile data by location, and the social context function 32 may obtain the current location of the user 16 and query the source of historical aggregate profile data for historical aggregate profile data for the current location of the user 16. The historical aggregate profile data is generally an aggregation of user profiles for users previously located at or near the current location of the user 16. For example, if the current location of the user 16 maps to a POI, the historical aggregate profile data may be an aggregation of interests defined in user profiles of users that were located at the POI during one or more historical time periods (e.g., the last week, weekday evenings from 7 pm to 11 pm, or the like). The historical aggregate profile data may be expressed as a list of user interests found in the user profiles of the users previously located at or near the current location of the user 16 and, for each interest, a value reflecting a degree to which the user interest is found in the user profiles of the users previously located at or near the current location of the user 16. The historical aggregate profile data may define, at least in part, the social context of the user 16.

In addition or alternatively, the one or more social context data sources 22 may include a source of crowd data, and the social context function 32 may query the source of crowd data for an aggregate profile of a crowd in which the user 16 is currently located and/or aggregate profiles of one or more crowds at or near the current location of the user 16. The aggregate profile for a crowd is generally an aggregation of user profiles of a number of users in the crowd. For example, the aggregate profile of a crowd may be expressed as a list of user interests found in the user profiles of the users in the crowd and, for each user interest, a number of user matches for the interest among the users in the crowd and/or a ratio of the number of user matches for the interest among the users in the crowd over a total number of users in the crowd. The aggregate profile(s) of the crowd(s) may define, at least in part, the social context of the user 16.

Still further, the social context function 32 may query the social networking service 20 for a list of friends that are currently located near the user 16 (e.g., friends within a defined distance from the user 16, friends at the same POI as the user 16, or the like). The friends located near the user 16 or the number of friends near the user 16 may define, at least in part, the social context of the user 16. In a similar manner, the social context of the user 16 may include the friends and friends-of-friends or the number of friends and friends-of-friends located near the user 16.

Lastly, the social context data that defines the social context of the user 16 may include social context data received from the ACSU client 38 of the mobile device 14 of the user 16. The social context data received from the ACSU client 38 may include a list of devices detected by a wireless Local Area Network (LAN) or wireless Personal Area Network (PAN) interface (e.g., an IEEE 802.11x or Bluetooth® interface) of the mobile device 14 of the user 16, calendar information from a calendar entry from a calendar application or feature of the mobile device 14 where the calendar entry includes information such as information that describes the location of the user 16 at the current time (e.g., calendar entry for Bill's birthday party) and/or identifies a number of users scheduled to be near the user 16 (e.g., the other participants in a scheduled meeting).

The data defining the social context may then be stored in the user record of the user 16. In one embodiment, the user record includes a number of social context records that store the data defining the social context of the user 16 at corresponding points in time. In one embodiment, each social context record may include a unique record ID, an identifier of the user 16 (e.g., a username), a status (e.g., checked-in, checked-out, or status update) that indicates whether a check-in, check-out, and/or status update resulted from the social context defined by the social context record, a timestamp identifying a date and time at which the social context record was created, the POI at which the user 16 was located at that time, an activity being performed by the user 16 at that time (e.g., listening to song X by artist Y, purchased item Z, chatting with person A, or the like), a mode of transportation (e.g., walking, driving, bicycling, or flying), any calendar event data, and information identifying any website that the user 16 is logged into at that time.

Once the social context of the user 16 is determined, the automatic check-in function 34 determines whether to perform an automatic check-in for the user 16 based on the social context of the user 16 and the automatic check-in rules of the user 16 (step 1006). In addition, the automatic check-in function 34 may consider system-defined rules such as rules defining POI types from which automatic check-ins are always permitted (assuming that the user 16 has also permitted automatic check-ins from those POI types), POI types from which automatic check-ins are never permitted even if the user 16 has given permission to provide automatic check-ins from those POI types, or the like. Still further, if the current location of the user 16 does not map to a POI, then the automatic check-in function 34 determines that an automatic check-in is not to be performed. In some embodiments, if the current location of the user 16 does not map to a POI, a new POI may automatically be created at the current location of the user 16. However, certain criteria may be required to be satisfied before a new POI is automatically created (e.g., the user 16 must have been at the POI for more than a threshold amount of time such as, for example, 30 minutes).

If an automatic check-in is not to be performed, the process proceeds to step 1010. If an automatic check-in is to be performed, the automatic check-in function 34 performs an automatic check-in for the user 16 at the POI corresponding to the current location of the user 16 (step 1008). More specifically, in this embodiment, the automatic check-in function 34 communicates with the check-in service 18 to automatically perform a check-in (i.e., an automatic check-in) for the user 16 at the POI corresponding to the current location of the user 16. Notably, any credentials of the user 16 needed to perform the automatic check-in on behalf of the user 16 such as, for example, a username and password of the user 16 for the check-in service 18 may be provided to the ACSU server 26 by the user 16 in advance and stored in the user record of the user 16. For instance, the credentials of the user 16 may be provided by the user 16 during a registration or initial configuration process. Preferably, the automatic check-in is performed without any interaction with the user 16. However, in an alternative embodiment, a confirmation message may be provided to the user 16 to request confirmation from the user 16 that the user 16 desires to check-in to the POI before performing the check-in on behalf of the user 16.

Before proceeding, it should be noted that at some point after the automatic check-in is performed, the user 16 will check-out of the POI or will be automatically checked-out of the POI such that the user 16 is no longer indicated as being at the POI. The check-out may be performed manually by the user 16. Alternatively, the check-out may be performed automatically by the automatic check-in function 34. The user 16 may be automatically checked-out of the POI, for example, when the user 16 is no longer at the POI, when the user 16 has been gone from the POI for at least a predefined threshold amount of time, when the user 16 is located more than a predefined threshold distance from the POI, or the like.

Next, in this embodiment, the automatic status update function 36 of the ACSU server 26 determines whether to send an automatic status update for the user 16 based on the social context of the user 16 and the automatic social update rules of the user 16 (step 1010). In addition, the automatic status update function 36 may consider system-defined rules such as rules defining POI types from which automatic status updates are always permitted (assuming that the user 16 has also permitted automatic status updates from those POI types), POI types from which automatic status updates are never permitted even if the user 16 has given permission to provide automatic status updates from those POI types, or the like.

If an automatic status update is not to be sent, the process returns to step 1002. If an automatic status update is to be sent, the automatic status update function 36 generates and sends an automatic status update for the user 16 (step 1012) and then the process returns to step 1002. More specifically, in this embodiment, the automatic status update function 36 automatically generates a status update for the user 16 based on the social context of the user 16. For example, if the user 16 is located at a POI, the automatic status update function 36 may generate a status update stating that the user 16 is currently at the POI. Still further, if the user 16 is located at the POI with a number (M) of his friends, the status update may be generated to state that the user 16 is located at the POI with M of his friends. As another example, if the user 16 is located at a POI with his friends Bill, Tammy, and Susie, the status update may be generated to state that user 16 is at the POI with his friends Bill, Tammy, and Susie. As a final example, if the user 16 is listening to rock music and is near his friends Ken, Vicky, and Brad, the status update may be generated to state that the user 16 is "rocking out with Ken, Vicky, and Brad." Note that the exemplary status updates generated above are exemplary and are not intended to limit the scope of the present disclosure. Numerous other types of automatically generated status updates that are personalized based on the social context of the user 16 will be appreciated by one of ordinary skill in the art upon reading this disclosure and are considered within the scope of the present disclosure.

The status update automatically generated by the automatic status update function 36 may automatically be sent to the social networking service 20 for distribution without interaction from the user 16. Additionally, the status update automatically generated by the automatic status update function 36 may automatically update the user's profile. Alternatively, the generated status update may be sent to the ACSU client 38 of the mobile device 14 of the user 16 for confirmation and, optionally, editing by the user 16 before any automated actions are performed. Once confirmation and any edits are received from the user 16, the automatic status update function 36 sends the status update to the social networking service 20 for distribution. Notably, any credentials of the user 16 needed to send the automatic status update on behalf of the user 16 such as, for example, a username and password of the user 16 for the social networking service 20 may be provided to the ACSU server 26 by the user 16 in advance and stored in the user record of the user 16. For instance, the credentials of the user 16 may be provided by the user 16 during a registration or initial configuration process.

Once the status update is received by the social networking service 20, the social networking service 20 delivers the status update according to the normal operation of the social networking service 20 (e.g., post the status update to the Facebook® wall of the user 16, send the status update to the Twitter® followers of the user 16, or the like depending on the particular implementation of the social networking service 20). Alternatively, the social networking service 20 may provide global or individualized filtering in order to reduce the number of or types of automatic status updates received by users of the social networking service 20. For example, the social networking service 20 may filter automatic status updates such that automatic status updates are not delivered to recipients at a rate greater than a predefined maximum rate (e.g., no more than 1 automatic status update per 30 minutes). As another example, the social networking service 20 may enable the users of the social networking service 20 to define individual filtering criteria to control the number and types of automatic status updates received from other users (e.g., maximum rate of automatic status update receipt, no status updates from users located at bars, or the like). Any conflicts between filtering criteria may be resolved by assigning priorities to the filtering criteria.

It should be noted that while FIGS. 1 and 2 illustrate an embodiment where the ACSU server 26 provides both automatic check-ins and automatic status updates for the users 16, the present disclosure is not limited thereto. More specifically, in one embodiment, the ACSU server 26 includes the automatic check-in function 34 and not the automatic status update function 36 such that the ACSU server 26 performs automatic check-ins for the users 16 but does not send automatic status updates for the users 16. In another embodiment, the ACSU server 26 includes the automatic status update function 36 but not the automatic check-in function 34 such that the ACSU server 26 sends automatic status updates for the users 16 but does not perform automatic check-ins for the users 16. In yet another embodiment, the ACSU server 26 includes both the automatic check-in function 34 and the automatic status update function 36, but each of the users 16 may choose to have the ACSU server 26 only perform automatic check-ins for the user 16 or only send automatic status updates for the user 16 by, for example, defining automatic check-in rules but not automatic status update rules or vice versa or by activating/deactivating automatic check-ins and/or automatic status updates via a corresponding feature of the ACSU server 26.

In addition, the ACSU server 26 may enable the users 16 to review and edit automatic check-ins previously performed for the users 16 and automatic status updates previously sent for the user 16. For example, the ACSU server 26 may enable the user 16 to view a log of automatic check-ins performed for the user 16 and enable the user 16 to delete previous check-ins performed by the user 16 such that those check-ins are no longer available via the check-in service 18. In response to such deletions, the ACSU server 26 may automatically update the automatic check-in rules to prevent automatic check-ins in the future for the user 16 when in the same or similar social contexts as the social contexts of the user 16 at the time of performing the deleted automatic check-ins. In a similar manner, the ACSU server 26 may enable the user 16 to view a log of automatic status updates sent for the user 16 and enable the user 16 to edit and/or delete those status updates. If status updates are deleted, the ACSU server 26 may automatically update the automatic status update rules of the user 16 to prevent automatic status updates in the future for the user 16 when in the same or similar social contexts as the social contexts of the user 16 at the time of performing the deleted automatic social updates.

Figure 3A:
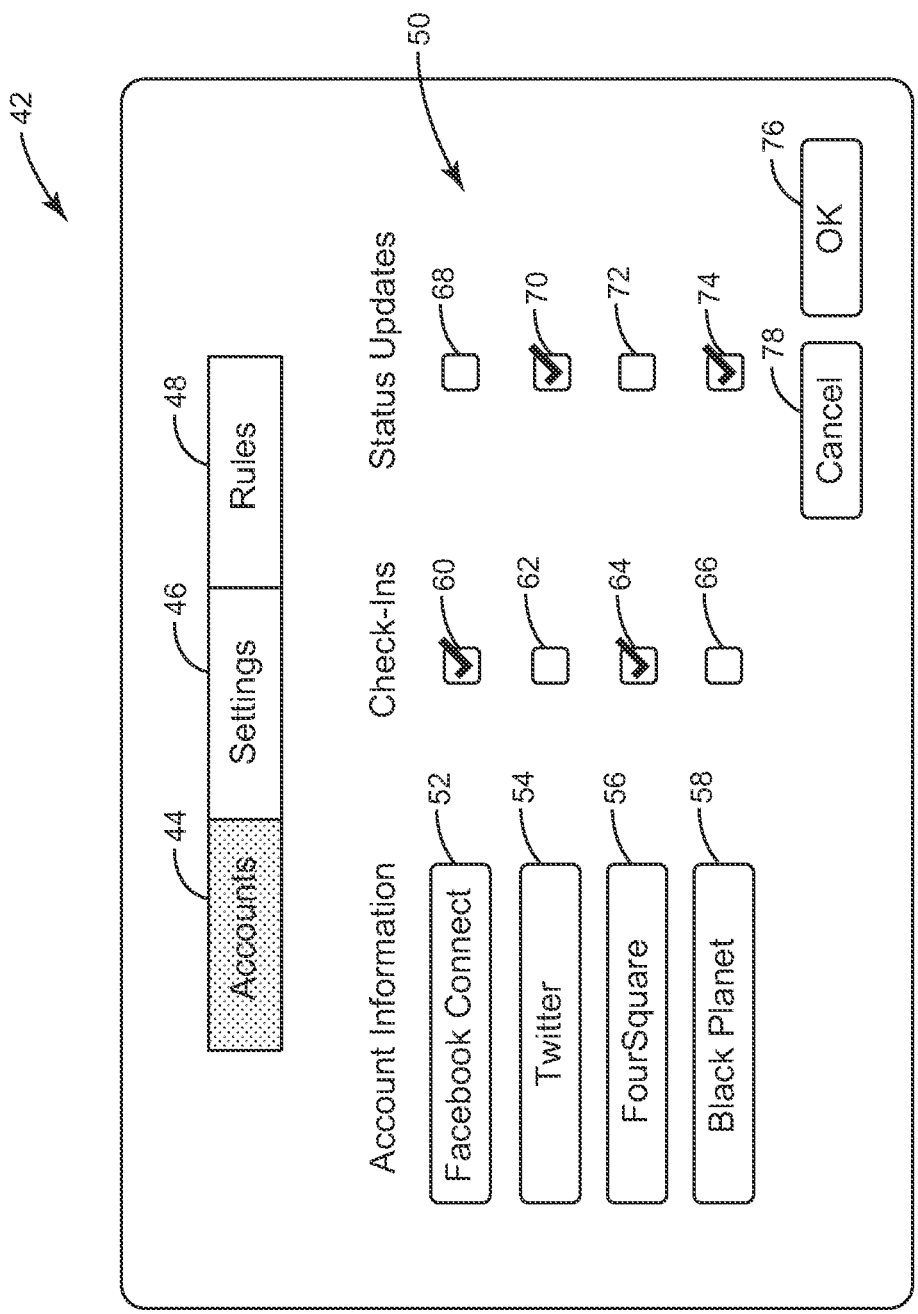
FIGS. 3A through 3C illustrate an exemplary Graphical User Interface (GUI) that enables a user to configure settings and rules for automatic check-ins and automatic status updates according to one embodiment of the present disclosure.

FIGS. 3A through 5 illustrate exemplary Graphical User Interfaces (GUIs) that enable the users 16 to define automatic check-in and automatic status update rules according to one exemplary embodiment of the present disclosure. These GUIs may be provided by the ACSU clients 38 of the mobile devices 14 of the users 18 or provided by the ACSU server 26 for presentation to the users 16 via the ACSU clients 38 of the mobile devices 14 of the users 16. More specifically, FIGS. 3A through 3C illustrate a first exemplary GUI 42 presented to the user 16 according to one embodiment of the present disclosure. The GUI 42 includes an Accounts tab 44, a Settings tab 46, and a Rules tab 48. In FIG. 3A, the Accounts tab 44 is selected such that the GUI 42 presents a corresponding Accounts screen 50 to the user 16. The Accounts screen 50 includes buttons 52 through 58 for corresponding check-in and/or social network services with which the user 16 is or may be registered. The user 16 can select the buttons 52 through 58 to enter his login information for the corresponding check-in and/or social networking services. For example, the user 16 can select the Facebook Connect button 52 to enter his login information for the Facebook® social networking service in order to enable the ACSU server 26 to perform automatic check-ins and/or automatic status updates for the user 16 via the Facebook® social networking service. In addition, the Accounts screen 50 includes check boxes 60 through 66 that enable the user 16 to select whether automatic check-ins are to be performed for the corresponding services. In this example, the user 16 has chosen to permit automatic check-ins for Facebook® and FourSquare™ by selecting the corresponding check boxes 60 and 64. In a similar manner, the Accounts screen 50 includes check boxes 68 through 74 that enable the user 16 to select whether automatic status updates are to be performed for the corresponding services. In this example, the user 16 has chosen to permit automatic status updates for Twitter® and Black Planet by selecting the corresponding check boxes 70 and 74. The user 16 can select an OK button 76 to accept the configurations set via the GUI 42 or a Cancel button 78 to cancel without accepting any changes to the configurations set via the GUI 42.

Figure 3B:
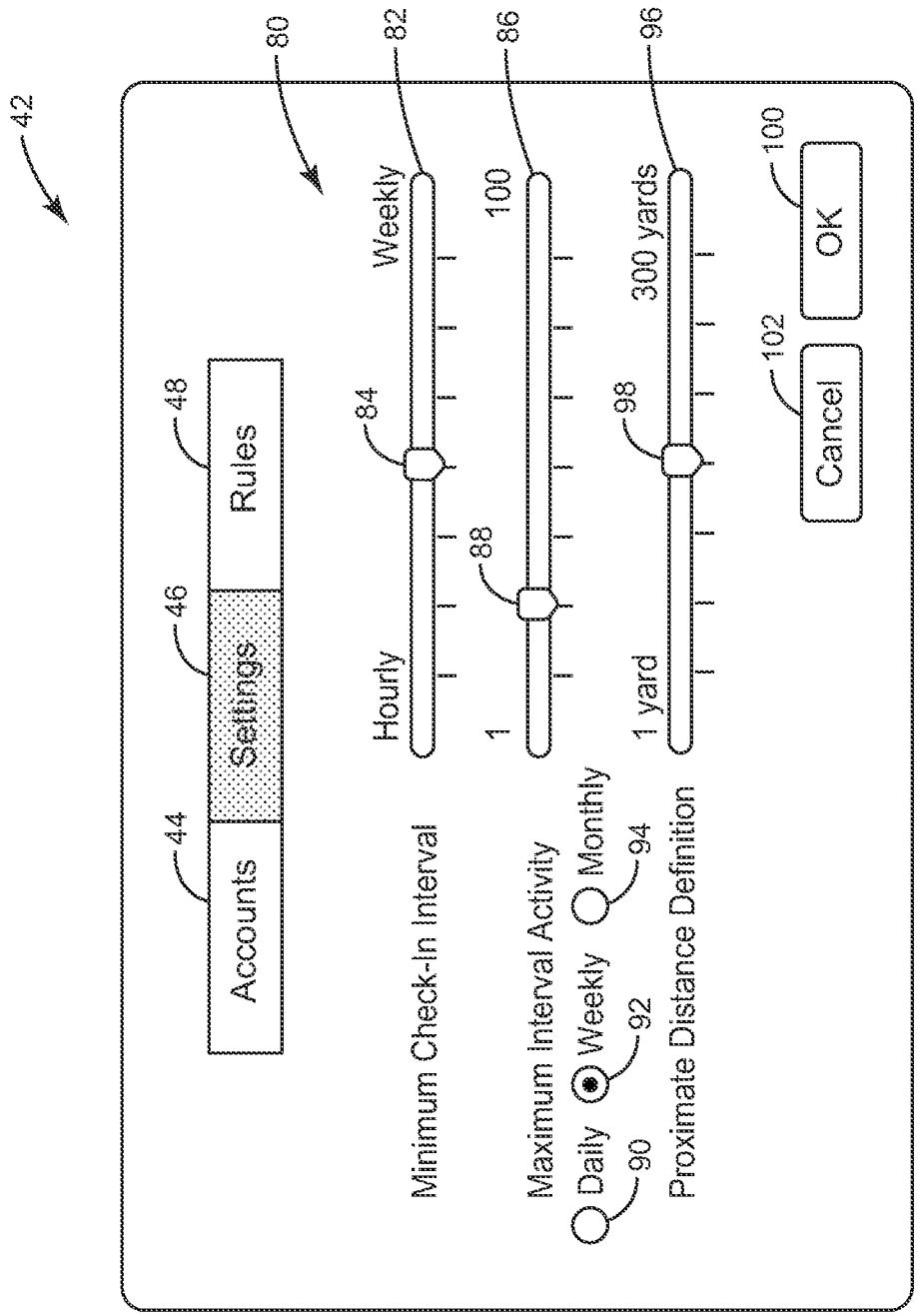

As shown in FIG. 3B, when the user 16 selects the Settings tab 46, a Settings screen 80 is presented to the user 16. The Settings screen 80 generally enables the user 16 to configure a number of settings to be used by the ACSU server 26 when performing automatic check-ins and/or sending automatic status updates on behalf of the user 16. In this example, the Settings screen 80 includes a minimum check-in interval slider bar 82 having a corresponding slider 84 for configuring a minimum check-in interval. The minimum check-in interval is a minimum amount of time between automatic check-ins for the user 16. Here, the minimum check-in interval can be configured to be anywhere from 1 hour to 1 week. The Settings screen 80 also includes a maximum interval activity slider bar 86 having a corresponding slider 88 for configuring a maximum interval activity. The maximum interval activity limits the number of automatic check-ins and/or automatic status updates per day when radio button 90 is selected, per week when radio button 92 is selected, and per month when radio button 94 is selected. Still further, the Settings screen 80 includes a proximate distance slider bar 96 having a corresponding slider 98 for configuring a proximate distance definition. The proximate distance definition defines a threshold distance to be used when determining whether the user 16 is spatially proximate to a location, a POI, a friend, or the like, depending on the particular implementation. For example, POIs may be defined as a location rather than a geographic area. The user 16 may then be determined to be at the POI when the user 16 is within the defined proximate distance from the location of the POI. Lastly, the Settings screen 80 includes an OK button 100 that can be selected to accept the configurations set via the GUI 42 and a Cancel button 102 that can be selected to cancel without accepting any changes to the configurations set via the GUI 42.

Figure 3C:
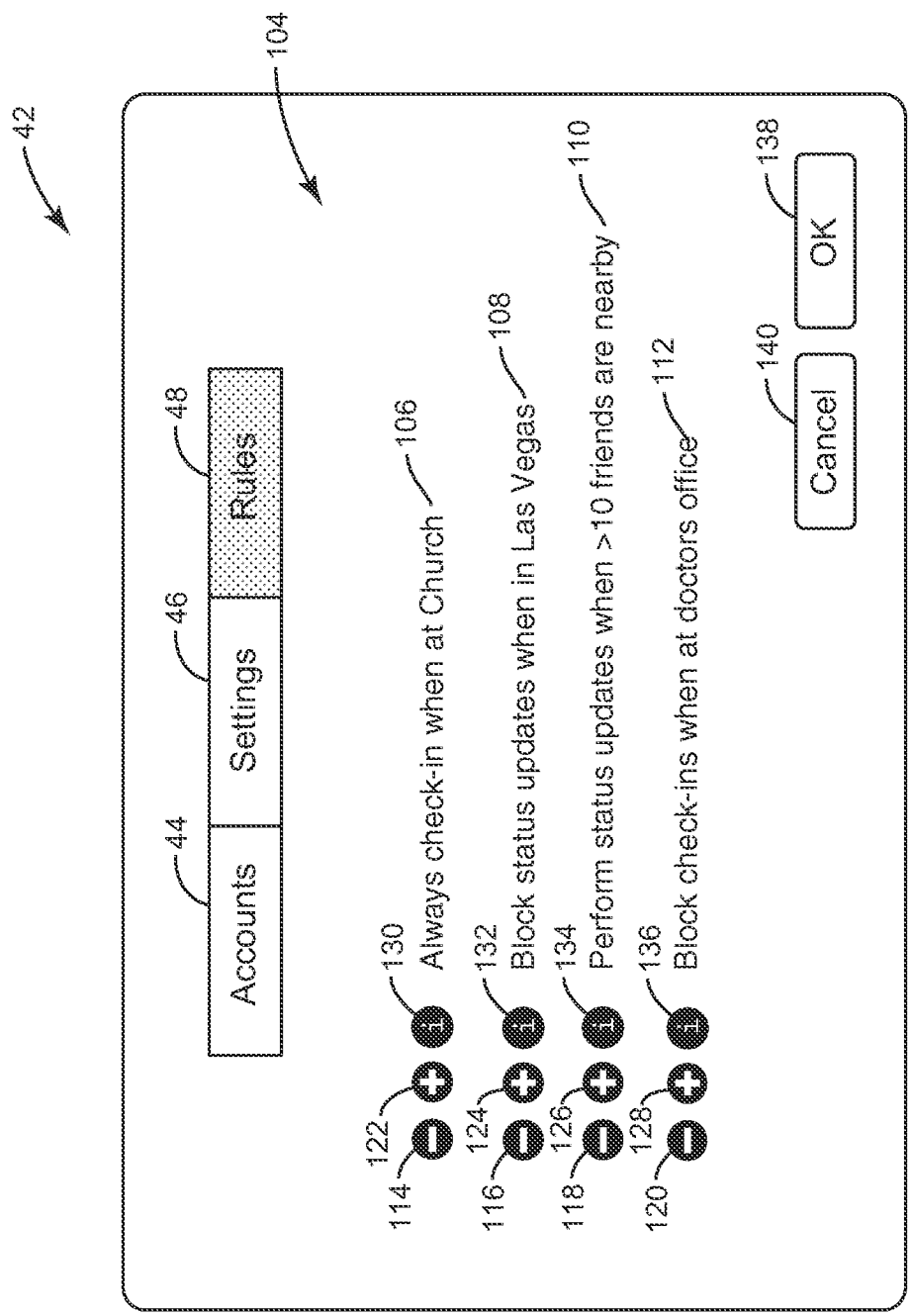

As illustrated in FIG. 3C, when the Rules tab 48 is selected, a Rules screen 104 is presented to the user 16. In general, the Rules screen 104 enables the user 16 to define automatic check-in rules and/or automatic status update rules. Specifically, in this example, the user 16 has already created rules 106 through 112. Notably, the order of the rules 106 through 112 from top to bottom corresponds to priorities of the rules from 106 through 112 from highest to lowest. The Rules screen 104 includes buttons 114 through 120, buttons 122 through 128, and buttons 130 through 136. The buttons 114 through 120 enable the user 16 to delete the corresponding rules 106 through 112 (e.g., the user 16 can select the button 114 to delete the rule 106). The buttons 122 through 128 enable the user 16 to create new rules using a rule builder dialog. More specifically, the buttons 122 through 128 enable the user 16 to create a new rule immediately below the corresponding rules 106 through 112 (e.g., the user 16 can select the button 122 to create a new rule between the rules 106 and 108). Lastly, the buttons 130 through 136 enable the user 16 to open a rule builder dialog to modify the corresponding rules 106 through 112. Lastly, the Rules screen 104 includes an OK button 138 that can be selected to accept the configurations set via the GUI 42 and a Cancel button 140 that can be selected to cancel without accepting any changes to the configurations set via the GUI 42.

Figure 4:
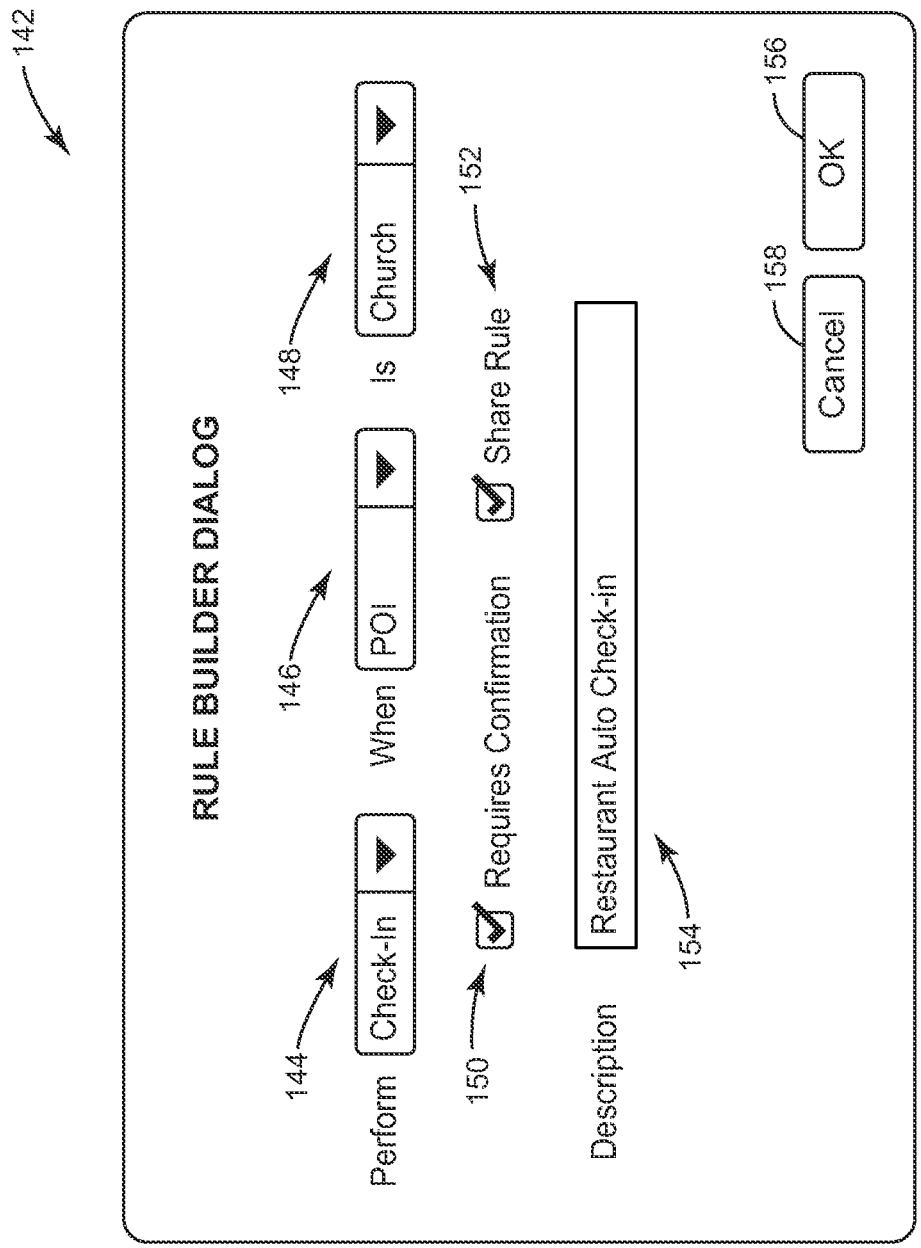
FIG. 4 illustrates an exemplary rule builder dialog that enables a user to create an automatic check-in or automatic status update rule according to one embodiment of the present disclosure.

FIG. 4 illustrates an exemplary rule builder dialog 142 presented to the user 16 in response to selecting one of the buttons 122 through 128 to create a new rule or in response to selecting one of the buttons 130 through 136 to modify one of the corresponding rules 106 through 112. The rule builder dialog 142 enables the user 16 to select an action via an action pull-down menu 144, select a condition via a condition pull-down menu 146 that defines when the action is to be performed, and select a qualifier via a qualifier pull-down menu 148. The rule builder dialog 142 includes check box 150 that enables the user 16 to define whether confirmation is to be obtained from the user 16 before performing the action and a check box 152 that enables the user 16 to enable sharing of the rule with other users 16. Text box 154 enables the user 16 to enter a description for the rule. Lastly, the rule builder dialog 142 includes an OK button 156 that enables the user 16 to complete the creation or modification of the rule and a Cancel button 158 that enables the user 16 to cancel creation or modification of the rule.

Figure 5:
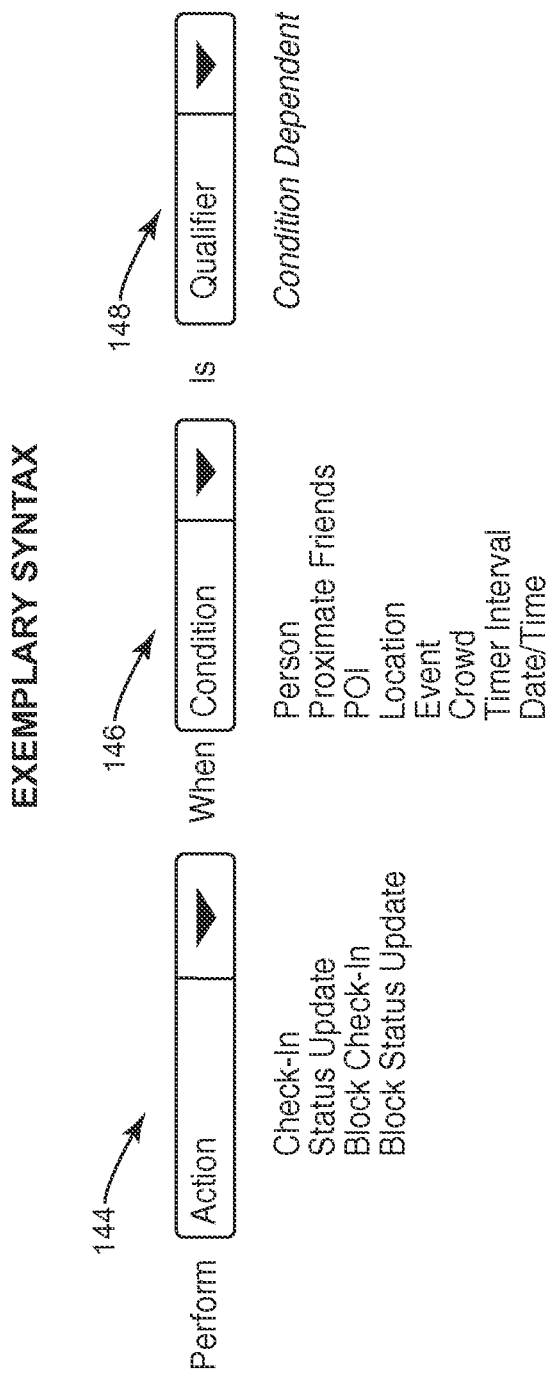
FIG. 5 illustrates a syntax of the rule builder dialog of FIG. 4 according to one embodiment of the present disclosure.
Figure 6:
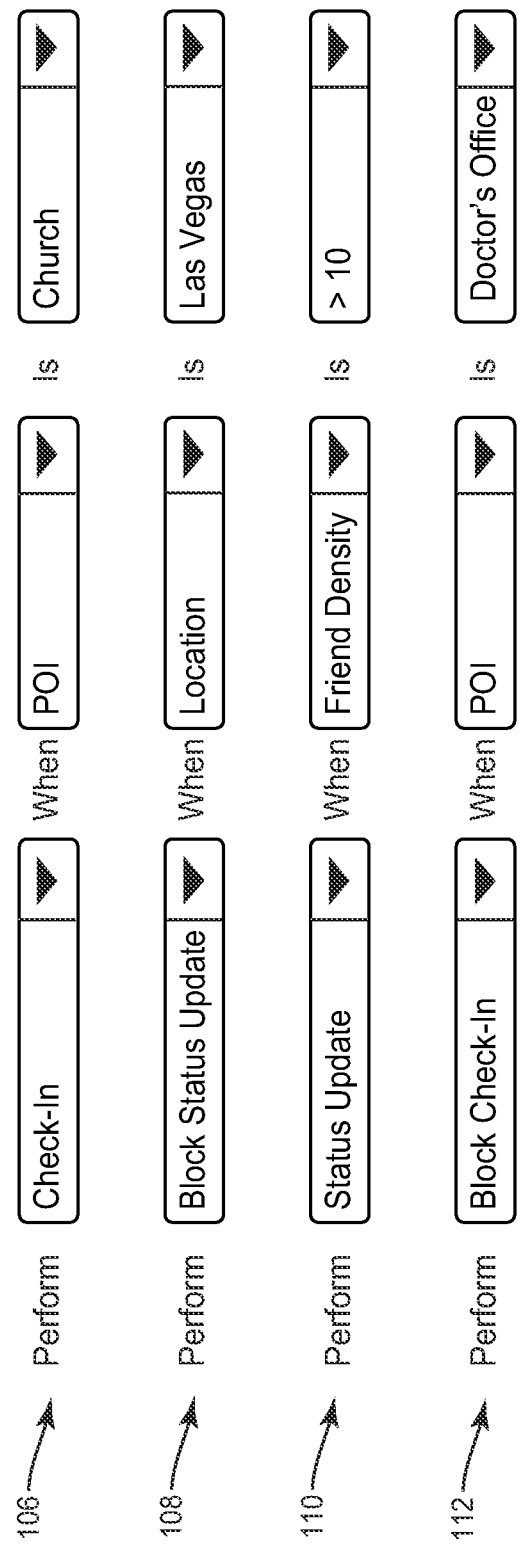
FIG. 6 illustrates a number of exemplary rules defined via the rule builder dialog of FIG. 4 according to one embodiment of the present disclosure.

FIG. 5 illustrates an exemplary syntax for the rule builder dialog 142. More specifically, FIG. 5 illustrates exemplary actions (e.g., check-in, status update, block check-in, and block status update) and conditions (e.g., person, proximate friends, POI, location, event, crowd, timer interval, and date/time) that may be available to the user 16 via the rule builder dialog 142. Notably, the qualifiers available in the qualifier pull-down menu 148 depend on the selected condition. FIG. 6 illustrates the rules 106 through 112 of FIG. 3C having been defined by the rule builder dialog 142.

Figure 7:
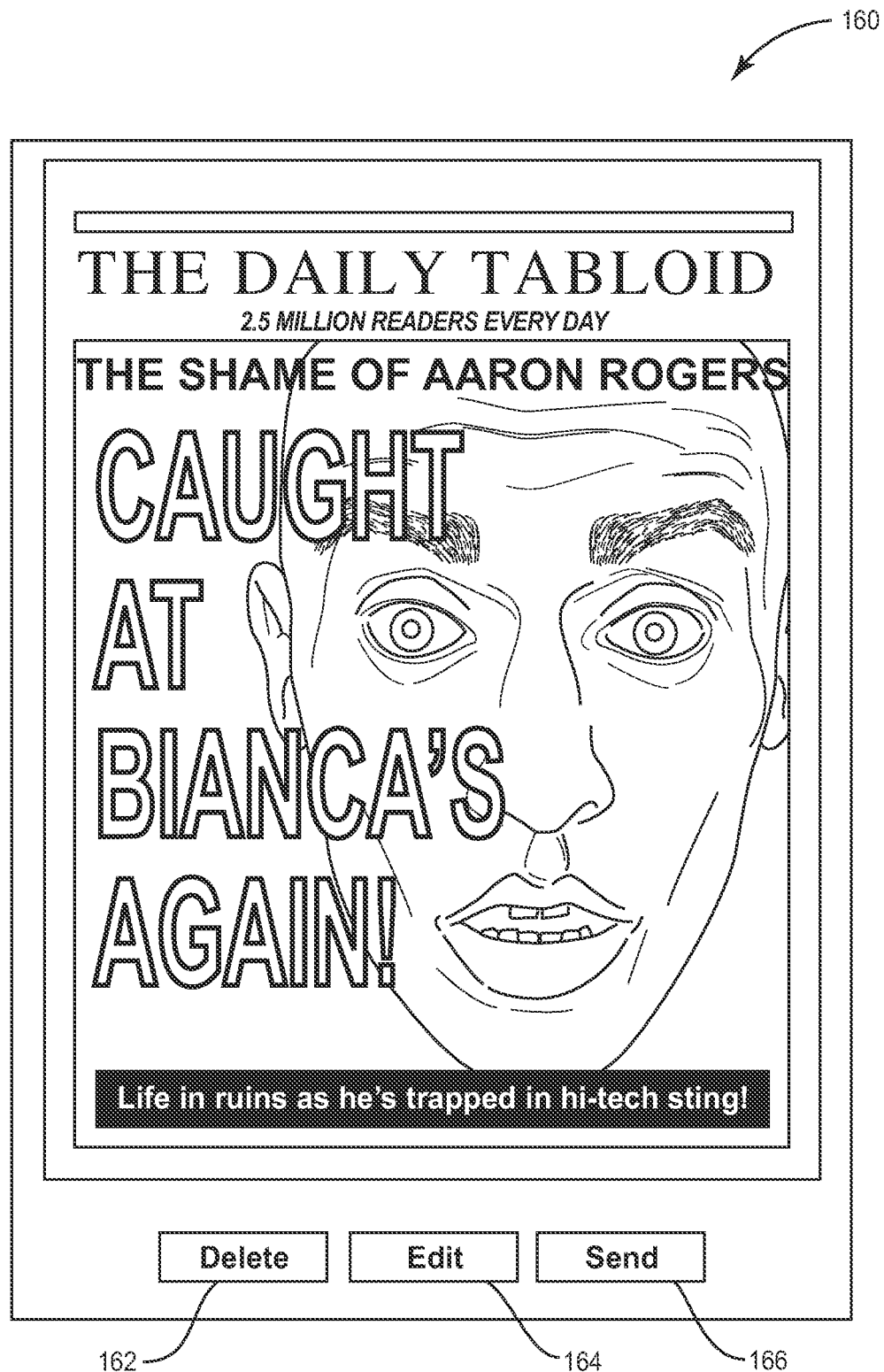
FIG. 7 illustrates an exemplary status update generated according to a personalized style defined by a user for which the status update is generated according to one embodiment of the present disclosure.

FIG. 7 illustrates an exemplary status update automatically generated by the automatic status update function 36 of the ACSU server 26 according to another embodiment of the present disclosure. In this embodiment, each of the users 16 may choose or select a predefined personal style (also referred to herein as "persona") for his status updates. The personal style chosen or selected by the user 16 or information defining the personal style chosen or selected by the user 16 may be stored in the user record of the user 16. The user 16 chooses or selects his personal style in advance before the ACSU server 26 operates to generate and send status updates based on the social context of the user 16. Some exemplary personal styles are a Police Report style, a Hollywood Reporter or Paparazzi style, a Tattle Tale style, a Private Investigator style, a Young Child style, a Religious Zealot style, a Valley Girl style, an Obituary style, a Tabloid style, a Network Nightly News style, a Commercial style, or the like. The user 16 may select his desired personal style from a number of predefined styles provided by the ACSU server 26 or define his own personal style using, for example, an authoring tool provided by the ACSU server 26 or the ACSU client 38. A personal style generally includes a template that may be personalized by the user 16 by inserting, for example, a picture and text. Thereafter, when the social context of the user 16 is such that the automatic status update function 36 generates an automatic status update to be sent on behalf of the user 16, the automatic status update is generated according to the personal style of the user 16. For instance, a natural language generation engine may be utilized to generate text to be entered into the template for the personal style of the user 16 based on the social context of the user 16.

Turning to the specific example of FIG. 7, an exemplary status update 160 is illustrated, where the status update 160 has been generated according to a personal style of the user 16 for which the status update is to be sent. In this example, the personal style is a Tabloid style that has been personalized with a picture of the user 16 and the text "THE SHAME OF AARON ROGERS" and "CAUGHT AT _____ AGAIN!", where the space "_____" represents the name of the current location or POI of the user 16 to be inserted into the status update by the automatic status update function 36. In this example, the current location of the user 16 corresponds to the home of a person named "Bianca," which may be a friend of the user 16. The current location of the user 16 is matched to Bianca's home address using, for example, an address book maintained by the mobile device 14 of the user 16. This may be reported to the ACSU server 26 by the ACSU client 38 as social context data for the user 16. The automatic status update function 36 then inserts "BIANCA'S" into the space in the template for the Tabloid style to thereby generate the status update 160 for the user 16. In this example, the status update 160 is returned to the mobile device 14 for presentation to the user 16 before sending the status update 160. The user 16 may choose to cancel the status update 160 by selecting a "Delete" button 162, edit the status update 160 by selecting an "Edit" button 164, or send the status update 160 by selecting a "Send" button 166.

Notably, in the example above, the user 16 has selected the desired personal style. However, in another embodiment, the personal style for a status update may be automatically selected by the ACSU server 26 based on the context of the user 16 (e.g., location, nearby friends, time of day, day of the week, POI type, or the like) or a target audience for the status update (e.g., friends, family, co-workers, or the like). For example, the user 16 may pre-define a number of personal styles and corresponding contexts for which the personal styles are to be used. For instance, the user 16 may define one personal style to be used when at work or during work hours, another personal style to be used when the user 16 is at church, another personal style to be used when the target audience of a status update includes the friends of the user 16, or the like.

Figure 8:
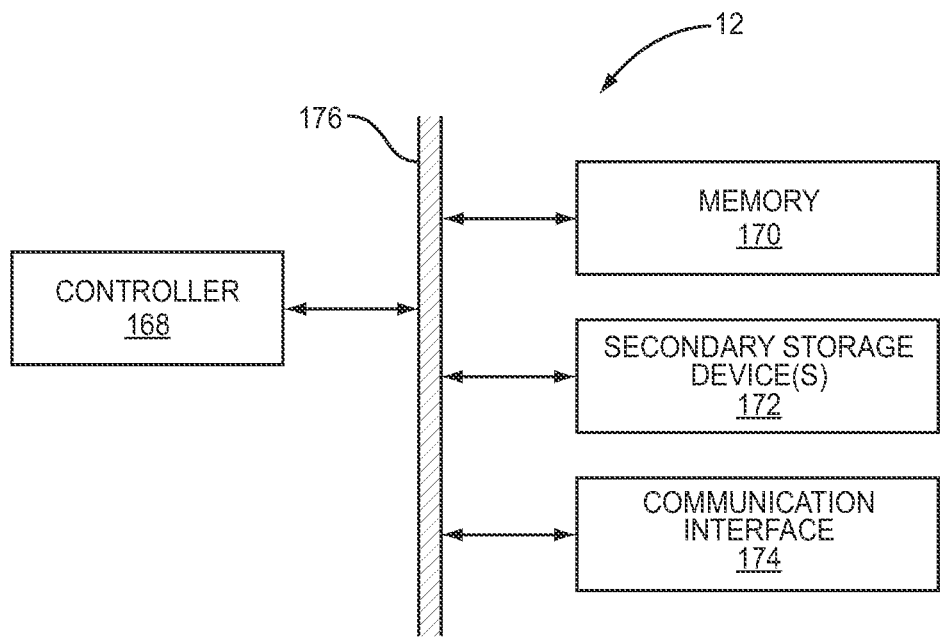
FIG. 8 is a block diagram of the server computer hosting the ACSU server of FIG. 1 according to one embodiment of the present disclosure.

FIG. 8 is a block diagram of the server computer 12 according to one embodiment of the present disclosure. As illustrated, the server computer 12 includes a controller 168 connected to memory 170, one or more secondary storage devices 172, and a communication interface 174 by a bus 176 or similar mechanism. The controller 168 is a microprocessor, digital Application Specific Integrated Circuit (ASIC), Field Programmable Gate Array (FPGA), or similar hardware component. In this embodiment, the controller 168 is a microprocessor, and the ACSU server 26 (FIG. 1) is implemented in software and stored in the memory 170 for execution by the controller 168. Further, the user records repository 28 (FIG. 1) may be stored in the one or more secondary storage devices 172. The secondary storage devices 172 are digital data storage devices such as, for example, one or more hard disk drives. The communication interface 174 is a wired or wireless communication interface that communicatively couples the server computer 12 to the network 24 (FIG. 1). For example, the communication interface 174 may be an Ethernet interface, local wireless interface such as a wireless interface operating according to one of the suite of IEEE 802.11 standards, or the like.

Figure 9:
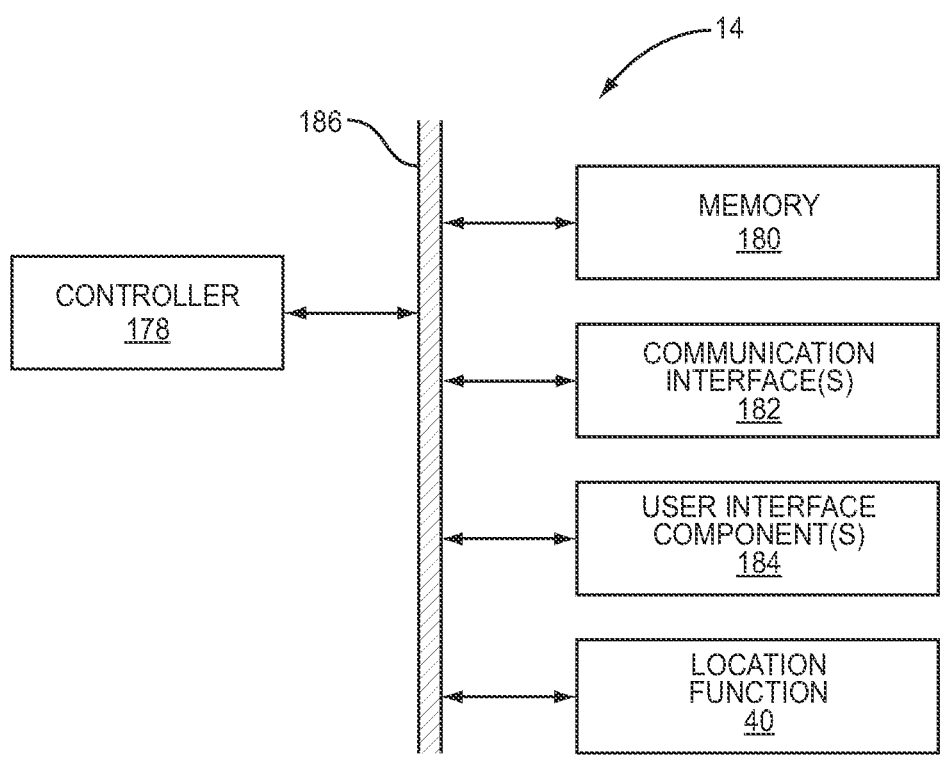
FIG. 9 is a block diagram of one of the mobile devices of FIG. 1 according to one embodiment of the present disclosure.

FIG. 9 is a block diagram of one of the mobile devices 14 according to one embodiment of the present disclosure. As illustrated, the mobile device 14 includes a controller 178 connected to memory 180, one or more communication interfaces 182, one or more user interface components 184, and the location function 40 by a bus 186 or similar mechanism. The controller 178 is a microprocessor, digital ASIC, FPGA, or similar hardware component. In this embodiment, the controller 178 is a microprocessor, and the ACSU client 38 is implemented in software and stored in the memory 180 for execution by the controller 178. In this embodiment, the location function 40 is a hardware component such as, for example, a GPS receiver. The one or more communication interfaces 182 include a wireless communication interface that communicatively couples the mobile device 14 to the network 24 (FIG. 1). For example, the one or more communication interfaces 182 may include a local wireless interface such as a wireless interface operating according to one of the suite of IEEE 802.11 standards, a mobile communications interface such as a cellular telecommunications interface, or the like. The one or more communication interfaces 182 may also include a Bluetooth® interface or other local wireless interface to, for example, detect nearby devices. Note that the same local wireless interface may be utilized to both connect the mobile device 14 to the network 24 and detect nearby devices. The one or more user interface components 184 include, for example, a touchscreen, a display, one or more user input components (e.g., a keypad), a speaker, or the like, or any combination thereof.

Figure 10:
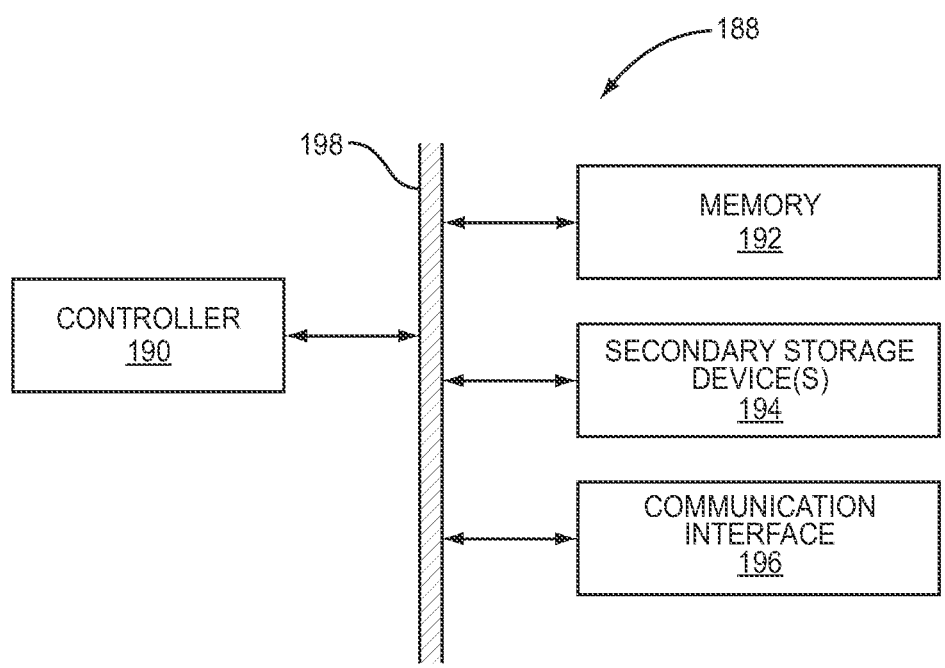
FIG. 10 is a block diagram of an exemplary computer server hosting the check-in service of FIG. 1 according to one embodiment of the present disclosure.

FIG. 10 is a block diagram of a server computer 188 hosting the check-in service 18 according to one embodiment of the present disclosure. As illustrated, the server computer 188 includes a controller 190 connected to memory 192, one or more secondary storage devices 194, and a communication interface 196 by a bus 198 or similar mechanism. The controller 190 is a microprocessor, digital ASIC, FPGA, or similar hardware component. In this embodiment, the controller 190 is a microprocessor, and the check-in service 18 is implemented in software and stored in the memory 192 for execution by the controller 190. The one or more secondary storage devices 194 are digital storage devices such as, for example, one or more hard disk drives.

The communication interface 196 is a wired or wireless communication interface that communicatively couples the server computer 188 to the network 24 (FIG. 1). For example, the communication interface 196 may be an Ethernet interface, local wireless interface such as a wireless interface operating according to one of the suite of IEEE 802.11 standards, a mobile communications interface such as a cellular telecommunications interface, or the like.

Figure 11:
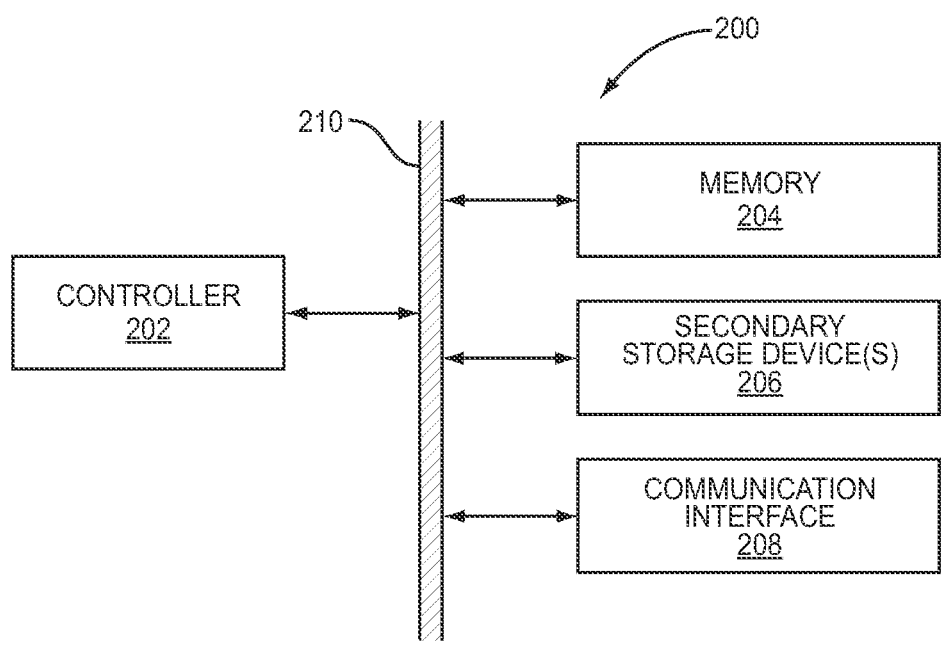
FIG. 11 is a block diagram of an exemplary computer server hosting the social networking service of FIG. 1 according to one embodiment of the present disclosure.

FIG. 11 is a block diagram of a server computer 200 operating to host the social networking service 20 according to one embodiment of the present disclosure. As illustrated, the server computer 200 includes a controller 202 connected to memory 204, one or more secondary storage devices 206, and a communication interface 208 by a bus 210 or similar mechanism. The controller 202 is a microprocessor, digital ASIC, FPGA, or similar hardware component. In this embodiment, the controller 202 is a microprocessor, and the social networking service 20 is implemented in software and stored in the memory 204 for execution by the controller 202. The one or more secondary storage devices 206 are digital storage devices such as, for example, one or more hard disk drives. The communication interface 208 is a wired or wireless communication interface that communicatively couples the server computer 200 to the network 24 (FIG. 1). For example, the communication interface 208 may be an Ethernet interface, local wireless interface such as a wireless interface operating according to one of the suite of IEEE 802.11 standards, a mobile communications interface such as a cellular telecommunications interface, or the like.

Those skilled in the art will recognize improvements and modifications to the preferred embodiments of the present disclosure. All such improvements and modifications are considered within the scope of the concepts disclosed herein and the claims that follow.

What is claimed is:

1. A computer implemented method comprising:
    obtaining two or more automatic check-in rules of a user of a mobile device, the two or more automatic check-in rules arranged in an order identifying a priority used in evaluation, ones of the two or more automatic check-in rules specified in parts, the parts including an action, a condition, and a qualifier, the parts independently editable by the user, wherein at least one rule of the two or more automatic check-in rules is a rule blocking automatic check-in based on one or more of a geographical area, a Point of Interest (POI), and a time period;
    determining a social context of the user, the social context of the user including a current location of the user of the mobile device;
    making a determination as to whether to perform the automatic check-in based on the two or more automatic check-in rules and the social context of the user; and
    automatically performing the automatic check-in for the user if the determination is made to perform the automatic check-in for the user.

2. The method of claim 1 further comprising:
    designating for inclusion with the automatic check-in, based on the current location, a template including at least one of image data and text data;
    designating an image stored at the mobile device;
    creating a combined image by combining the template and the designated image; and
    sending, to a server device, the automatic check-in including the combined image.

3. The method of claim 2 wherein:
    making the determination as to whether to perform the automatic check-in based on a triggering event, the triggering event based on one or more of an updated current location of the mobile device and an updated social context of the user of the mobile device; and
    the determination is based on one or more of the updated current location and the updated social context.

4. The method of claim 3 wherein the current location of the mobile device is described by data comprising one or more of:
    a name of a Point of Interest (POI) that corresponds to the current location; data that defines a Point of Interest (POI) type for a POI that corresponds to the current location; and
    data that describes an event being held at a venue corresponding to the current location.

5. The method of claim 3 wherein the updated social context of the user of the mobile device comprises one or more of:
    historical aggregate profile data for the current location of the user;
    an aggregate profile of a crowd of users in which the user is currently located;
    aggregate profiles of one or more corresponding crowds of users located at or near the current location;
    a list of one or more friends of the user located at or near the current location;
    a list of one or more friends of the user and one or more friends-of-friends of the user located at or near the current location;
    a number of friends of the user that are located at or near the current location; a number of friends and friends-of-friends of the user that are located at or near the current location; and
    a list of devices located at or near the current location.

6. The method of claim 2 wherein to send the automatic check-in to the server device the mobile device is further comprising:
    configuring the automatic check-in to include:
        a location of the mobile device at a time of check-in; and
        a Point of Interest (POI);
        and perform an action comprising one of:
            prompting the user of the mobile device for confirmation prior to sending the automatic check-in; and
            sending the automatic check-in automatically without user confirmation.

7. The method of claim 6 wherein the automatic check-in further includes:
    information identifying other users of other mobile devices to receive the automatic check-in.

8. The method of claim 2, wherein to send the automatic check-in to the server device, further comprising:
    configuring the automatic check-in; and perform an action comprising one of:
        prompting the user of the mobile device for confirmation prior to sending the automatic check-in; and
        sending the automatic check-in automatically without user confirmation.

9. The method of claim 2, wherein the mobile device is associated with the user and the automatic check-in is configured to be propagated to other mobile devices corresponding to other users, wherein the user and the other users are members of a social network.

10. The method of claim 2, wherein to make the determination to send the automatic check-in to the server device, further comprising:
- determining the social context, the social context indicating a friend density over a geographic area, the friend density based on friends of the user associated with the mobile device in a social network; and
- making the determination to send the automatic check-in to the server device based on the social context.

11. The method of claim 2, wherein to make the determination to send the automatic check-in to the server device, further comprising:
- receiving a minimum activity interval indicating a minimum automatic check-in rate over a time interval;
- receiving a maximum activity interval indicating a maximum automatic check-in rate over a time interval; and
- making the determination based on the minimum activity interval and the maximum activity interval.

12. The method of claim 2 wherein the template includes a graphic image provided by a business operator to be used as an advertisement in promoting a business associated with the business operator.

13. The method of claim 2, wherein to determine the current location of the mobile device, further comprising:
- determining the current location of the mobile device from a geographic location using a GPS receiver.

14. The method of claim 2, wherein to designate the template, further comprising:
- designating the template based on the social context of the user of the mobile device.

15. The method of claim 2, wherein to designate the template, further comprising:
- requesting the template from the server device based on the current location of the mobile device.

16. The method of claim 2 wherein:
- the template is received from an establishment associated with a location of the mobile device when the mobile device is determined to be at the location.

17. The method of claim 2, wherein to designate the template, further comprising:
- designating the template based on a user profile of the user associated with the mobile device.

18. The method of claim 2, wherein to designate the image stored at the mobile device, further comprising:
- designating an image including a face of the user associated with the mobile device.

19. The method of claim 2 wherein the rule blocking automatic check-in is one of:
- a first rule blocking the automatic check-in from being sent from the geographical area;
- a second rule blocking the automatic check-in from being sent from the Point of Interest (POI); and
- a third rule blocking the automatic check-in from being sent during the time period.

20. The method of claim 2 wherein at least one of the two or more automatic check-in rules is comprised of:
- a first part identifying an action to be taken;
- a second part identifying a condition to be met before the at least one of the two or more automatic check-in rules is satisfied; and
- a third part identifying a qualifier further identifying the condition to be met.

21. The method of claim 20 wherein:
- the first part identifying the action is one of a check-in action, a status-update action, a block check-in action, and a block status-update action; and
- the second part identifying the condition is one of a person condition, a proximate friends condition, a Point of Interest (POI) condition, a location condition, an event condition, a crowd condition, a timer interval condition, and a date/time condition.

22. A server device comprising:

a network interface operable to:
- communicatively couple the server device to a mobile device; and a processor and a memory associated with the network interface operable to:
- obtain two or more automatic check-in rules of a user of a mobile device, the two or more automatic check-in rules arranged in an order identifying a priority used in evaluation, ones of the two or more automatic check-in rules specified in parts, the parts including an action, a condition, and a qualifier, the parts independently editable by the user, wherein at least one rule of the two or more automatic check-in rules is a rule blocking automatic check-in based on one or more of a geographical area, a Point of Interest (POI), and a time period;
- determine a social context of the user, the social context of the user including a current location of the user of the mobile device;
- make a determination as to whether to perform the automatic check-in based on the two or more automatic check-in rules and the social context of the user; and
- automatically perform the automatic check-in for the user if the determination is made to perform the automatic check-in for the user.

23. A non-transitory computer-readable medium storing instructions executable by a processor to:
- obtain two or more automatic check-in rules of a user of a mobile device, the two or more automatic check-in rules arranged in an order identifying a priority used in evaluation, ones of the two or more automatic check-in rules specified in parts, the parts including an action, a condition, and a qualifier, the parts independently editable by the user, wherein at least one rule of the two or more automatic check-in rules is a rule blocking automatic check-in based on one or more of a geographical area, a Point of Interest (POI), and a time period;
- determine a social context of the user, the social context of the user including a current location of the user of the mobile device;
- make a determination as to whether to perform the automatic check-in based on the two or more automatic check-in rules and the social context of the user; and
- automatically perform the automatic check-in for the user if the determination is made to perform the automatic check-in for the user.

* * * * *